(12) United States Patent
Ishiyama

(10) Patent No.: US 7,518,967 B2
(45) Date of Patent: Apr. 14, 2009

(54) POSITION CONTROL METHOD AND DEVICE, AND OPTICAL DISK DEVICE

(75) Inventor: Yoshiyuki Ishiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 781 days.

(21) Appl. No.: 10/782,954

(22) Filed: Feb. 23, 2004

(65) Prior Publication Data

US 2004/0223425 A1 Nov. 11, 2004

(30) Foreign Application Priority Data

Feb. 25, 2003 (JP) .............................. 2003-046752
Mar. 28, 2003 (JP) .............................. 2003-090468

(51) Int. Cl.
*G11B 7/00* (2006.01)

(52) U.S. Cl. ............... 369/53.23; 369/53.35; 369/44.26

(58) Field of Classification Search ............... 369/53.23
See application file for complete search history.

(56) References Cited

U.S. PATENT DOCUMENTS

| | | | | | |
|---|---|---|---|---|---|
| 5,363,356 | A | * | 11/1994 | Tanaka et al. ............. | 369/44.29 |
| 5,440,534 | A | * | 8/1995 | Eastman et al. .......... | 369/44.27 |
| 5,757,742 | A | * | 5/1998 | Akiba et al. ............. | 369/44.23 |
| 5,862,112 | A | * | 1/1999 | Nagai et al. .............. | 369/44.36 |
| 5,940,364 | A | * | 8/1999 | Ogata et al. ............... | 369/275.4 |
| 6,188,657 | B1 | * | 2/2001 | Kim et al. ................. | 369/53.11 |
| 6,275,466 | B1 | * | 8/2001 | Nagasawa et al. ......... | 369/275.3 |
| 6,424,605 | B1 | * | 7/2002 | Iida ......................... | 369/44.27 |
| 6,775,209 | B2 | * | 8/2004 | Kobayashi ............... | 369/44.29 |
| 2002/0191506 | A1 | | 12/2002 | Okamoto et al. | |
| 2004/0240351 | A1 | * | 12/2004 | Iida et al. ................. | 369/47.55 |
| 2005/0111327 | A1 | * | 5/2005 | Erickson et al. .......... | 369/53.22 |

FOREIGN PATENT DOCUMENTS

| | | | |
|---|---|---|---|
| JP | 3-142714 | | 6/1991 |
| JP | 3-142722 | | 6/1991 |
| JP | 5-6551 | | 1/1993 |
| JP | 7-57279 | | 3/1995 |
| JP | 11-134674 | | 5/1999 |
| JP | 2001028134 A | * | 1/2001 |
| JP | 2001250247 A | * | 9/2001 |
| JP | 2002-109764 | | 4/2002 |

* cited by examiner

*Primary Examiner*—Wayne R Young
*Assistant Examiner*—Adam R Giesy
(74) *Attorney, Agent, or Firm*—Dickstein Shapiro LLP

(57) ABSTRACT

A position control method is disclosed that is capable of precisely and stably controlling a position of an object lens relative to a recording medium. When controlling the position of the object lens in the tracking direction, first, an attempt is made to read address information recorded on the recording medium, and if the address information is not readable, the polarity of the tracking error signal used for servo control is reversed. As a result, even for a recording medium of a low quality or a nonstandard recording medium, which are treated as invalid media in the related art, it is possible to locate the object lens to the target position.

10 Claims, 17 Drawing Sheets

POSITION CONTROL METHOD AND DEVICE, AND OPTICAL DISK DEVICE

BACKGROUND OF THE INVENTION

1. Field of the Invention

The present invention relates to a position control method, a program and a storage medium, a position control device, and an optical disk device, and more particularly, to a position control method for controlling a position of an object lens in a direction perpendicular to a tangential direction of a spiral or concentric track formed on a recording surface of a recording medium, a program and a storage medium used in an optical disk device, a position control device for controlling a position of an object lens in a direction perpendicular to a tangential direction of a spiral or concentric track formed on a recording surface of a recording medium, and an optical disk device including the position control device.

2. Description of the Related Art

Along with improvements in the capability of personal computers, it has become possible to process audio-visual (AV) data. Because the volume of AV data can be very large, optical disks having large capacities, such as CDs (Compact Disk) and DVDs (Digital Versatile Disk), are attracting more attention. As the price of the optical disks continues to go down, optical disk devices for accessing optical disks, which are used as common computer peripherals, are widely spread.

An optical disk device forms a light spot on a recording surface of a recording medium, for example, an optical disk, on which spiral or concentric tracks are formed, and thereby records data on or deletes data from the optical disk, or reproduces data based on light reflected from the recording surface. On an optical disk, there are mark regions (pit) and space regions, which have different reflectivity, and the data on the optical disk are represented by lengths and combinations of the two regions. The optical disk device has an optical pickup for emitting a light beam and receiving reflected light from the recording surface.

Generally, an optical pickup has an object lens, an optical system for directing a light beam from a light source to the recording surface and guiding the reflected light beam (returning light beam) from the recording surface to a specified position for light reception, and a light reception element located at the light reception position. The light reception element outputs signals which include not only information for reproducing the data recorded on the recording surface, but also information for controlling the positions of the optical pickup itself and the object lens (the latter information is referred to as "servo information").

In order to correctly record data at specified positions on the recording surface, or correctly reproduce data recorded at specified positions on the recording surface, the light spot must be precisely formed at the target position on the recording surface. For this purpose, it is necessary to accurately detect the position where the light spot is formed. Various methods have been proposed to accurately detect the position of a light spot. For example, the three-spot method is a well known method for detecting the position of a light spot on a recording surface.

In the three-spot method, the light beam emitted from the light source is divided into a main beam and two sub-beams.

FIG. 1 is a diagram for schematically explaining a position relation of light spots in the three-spot method.

As shown in FIG. 1, marks are formed on the recording surface along concentric or spiral tracks (only sections of tracks are illustrated in FIG. 1). In FIG. 1, the symbol Dtr indicates the direction perpendicular to a tangential direction of a track (hereinafter, Dtr is referred to as "a tracking direction").

The main beam and two sub-beams form three light spots on the recording surface, specifically, a light spot SP1 of the main beam and two light spots SP2 and SP3 of the two sub-beams. As shown in FIG. 1, the light spots SP1, SP2, and SP3 are not formed along the tangential direction of a track; the light spots SP2 and SP3 shift in the tracking direction Dtr, specifically, by ¼ of a track pitch (denoted by Tp/4), respectively.

The returning light beams of the two sub-beams are received by two light reception elements, respectively, and a tracking error signal is obtained from the difference between the amounts of light detected by the two light reception elements.

If the object lens is moved along the tracking direction Dtr, the positions of, the three light spots also move along the tracking direction Dtr.

FIG. 2 is a diagram for schematically explaining an on-track determination position in the tracking error (TE) signal obtained by the three-spot method.

As shown in FIG. 2, the tracking error signal TE is a periodic signal. When the level of the tracking error signal TE is or becomes zero (that is, at the zero-crossing point), then a so-called "on-track condition" occurs. In other words, when the level of the tracking error signal TE is or becomes zero, the light spot SP1 of the main beam is substantially at the center of a track (hereinafter, referred to as "track position".)

The level of the tracking error signal TE changes when the position of the object lens changes. For example, when the object lens is moved in the direction A (as shown in FIG. 2), the level of the tracking error signal TE increases gradually; when the level of the tracking error signal TE becomes zero (the zero-crossing point), it indicates that the on-track condition occurs, in other words, the light spot SP1 of the main beam is substantially at the center of a track. On the other hand, if the object lens is moved in the direction B, the level of the tracking error signal TE decreases gradually; and when the level of the tracking error signal TE becomes zero (the zero-crossing point), it indicates that the on track condition occurs, and the light spot SP1 of the main beam is at the track position. In this way, the position of the object lens can be controlled.

Exploiting this phenomenon, servo control (tracking control) is performed to maintain the light spot of the main beam to be on the track position during recording or reproduction operations.

FIG. 3 shows an example of waveforms of the tracking error signal, a tracking cross (TC) signal and a RF signal observed on an oscilloscope. The RF signal includes information of reproduced data.

In a recording medium on which guide grooves are not formed, such as a CD-ROM, the difference between the reflectivity of the mark regions and the reflectivity of the space regions largely contributes to the tracking error signal. On the other hand, in an optical disk on which guide grooves are formed, diffraction of the incident light beam near edges of the grooves largely contributes to the tracking error signal.

For example, Japanese Laid Open Patent Application No. 3-142714, Japanese Laid Open Patent Application No. 3-142722, Japanese Laid Open Patent Application No. 5-6551, and Japanese Laid Open Patent Application No. 7-57279 disclose background art of this technical field.

Along with a rapid increase in the number of users, recording media are being fabricated and supplied by more and more manufacturers. Among the large amount of recording media, there appear products having low quality, for example, having very small differences between the reflectivity of the mark regions and the reflectivity of the space regions, and also products not meeting the standards of the recording media.

Specifically, it is known that the difference between the reflectivity of the mark regions and the reflectivity of the space regions largely influences the level of the tracking error signal in a recording medium having no guide groove, but the above low-quality recording media cannot generate a tracking error signals having a sufficiently high level, and thus, it is difficult to precisely set a light spot on a target position. In addition, on the low-quality recording media, because the reflectivity is not uniform even on the same recording surface, it is difficult to perform stable position control. Furthermore, the RF signal associated with the nonstandard recording media may be abnormal.

Meanwhile, because these low-quality recording media or nonstandard recording media have been in the market in large amounts, they are being used by many users, and some important data have been recorded on such kinds of recording media. In this situation, the users are desirous of an optical disk device that can normally access a recording medium even when the recording medium is of low quality or is not a standard one.

SUMMARY OF THE INVENTION

It is a general object of the present invention to solve one or more of the above problems of the related art.

A first more specific object of the present invention is to provide a position control method and a position control device capable of precisely and stably controlling a position of an object lens relative to a recording medium.

A second more specific object of the present invention is to provide a program executable on a computer for controlling the optical disk device to precisely and stably control the position of the object lens relative to the recording medium, and a storage medium in which the program is stored.

According to a first aspect of the present invention, there is provided a position control method for controlling a position of an object lens in a direction perpendicular to a tangential direction of a spiral track or of concentric tracks formed on a recording surface of a recording medium without a guide groove. The position control method comprises a first step of trying to read a predetermined data recorded on the recording medium; a second step of determining whether or not the predetermined data is readable; and a third step of, according to whether or not the predetermined data is readable, switching a criterion for controlling the position of the object lens based on a tracking error signal.

According to the present invention, when controlling a position of an object lens in a tracking direction relative to a recording medium without a guide groove, first, an attempt is made to read a predetermined data recorded on the recording medium, and then, depending on whether or not the predetermined data is readable, the criterion for controlling the position of the object lens based on a tracking error signal is changed. If the predetermined data is not readable, by changing the criterion, it becomes possible to read the predetermined data. As a result, even when reading a recording medium of low quality or a nonstandard recording medium, which are treated as invalid media and is not readable by standard methods in the related art, it becomes possible to read data thereon. As a result, it is possible to locate the object lens to the target position, and thus, it is possible to precisely and stably control the position of the object lens relative to the recording medium.

In an embodiment, the third step may comprise a step of, if the predetermined data is not readable, switching to a criterion that includes reversing a polarity of the tracking error signal and controlling the position of the object lens based on the reversed-polarity tracking error signal.

In an embodiment, the third step may comprise a step of, if the predetermined data is not readable, switching to a criterion that includes shifting an on-track determination position in the tracking error signal by a predetermined amount tor control of the position of the object lens. The on-track determination position is a position at which it is determined that an on-track condition occurs.

In an embodiment, the predetermined amount may be half of a wavelength of a waveform of the tracking error signal.

According to the present invention, if the on-track determination position is shifted by half of a wavelength of the tracking error signal, the thus obtained tracking error signal is reversed in polarity relative to the original tracking error signal, just as mentioned above. When the on-track determination position is shifted by a predetermined amount other than half of a wavelength of the tracking error signal, the thus obtained tracking error signal is not exactly reversed in polarity relative to the original tracking error signal. In this way, there are more choices of switching the criterion for the position control of the object lens, enabling switching to an optimum criterion.

In an embodiment, the predetermined data may include an address data. Here, the "address data" does not mean only address itself, but also information from which an address can be deduced, or information of a change of an address.

In an embodiment, the first step is performed during a seek operation of the object lens.

In an embodiment, the first step is performed when determining a type of the recording medium.

In an embodiment, the first step is performed when reproducing a data recorded on the recording medium.

According to a second aspect of the present invention, there is provided a position control method for controlling a position of an object lens in a direction perpendicular to a tangential direction of a spiral track or of concentric tracks formed on a recording surface of a recording medium having a plurality of guide grooves. The position control method comprises a first step of trying to read a predetermined data recorded in the guide grooves or in a region between two of the guide grooves on the recording medium following a criterion for controlling the object lens based on a tracking error signal with respect to the guide grooves or the region between two of the guide grooves; a second step of determining whether or not the predetermined data is readable; and a third step of, according to whether or not the predetermined data is readable, switching the criterion and trying again to read the predetermined data recorded in the guide grooves or in the region between two of the guide grooves.

According to the present invention, when controlling a position of an object lens in a tracking direction relative to a recording medium having a plurality of guide grooves, first, an attempt is made to read a predetermined data recorded in the guide grooves or in the region between two of the guide grooves on the recording medium. This operation of trial reading is performed while following a criterion for controlling the object lens based on a tracking error signal with respect to the guide grooves or a tracking error signal with respect to the region between two of the guide grooves. Depending on whether or not the predetermined data is readable, the criterion is changed and an attempt is made again to read the predetermined data recorded in the guide grooves or in the region between two of the guide grooves. If the predetermined data is not readable, by changing the criterion, it becomes possible to read the predetermined data recorded in the guide grooves or in the region between two of the guide grooves. Therefore, even when reading a recording medium of low quality or a nonstandard recording medium, which are treated as invalid media and is not readable by standard methods in the related art, it becomes possible to read data thereon. As a result, it is possible to locate the object lens to the target position, and thus, it is possible to precisely and stably control the position of the object lens relative to the recording medium.

According to a third aspect of the present invention, there is provided a program executable on a computer for controlling an optical disk device that emits a light beam on a recording surface of a recording medium without a guide groove and receives light reflected from the recording surface of the recording medium. The program comprises a first step of trying to read a predetermined data recorded on the recording medium in response to a control request for controlling a position of an object lens in a direction perpendicular to a tangential direction of a spiral track or of concentric tracks formed on the recording surface of the recording medium; a second step of determining whether or not the predetermined data is readable; and a third step of, according to whether or not the predetermined data is readable, switching a criterion for controlling the position of the object lens based on a tracking error signal.

According to the present invention, a program of the present invention is loaded in a memory, and after a heading address of the program is set in a program counter, a computer for controlling an optical disk device attempts to read a predetermined data recorded on a recording medium in response to a control request for controlling a position of an object lens in a tracking direction. Depending on whether or not the predetermined data is readable, the computer changes the criterion for controlling the position of the object lens based on a tracking error signal. According to the program of the present invention, even when reading a low-quality recording medium or a nonstandard recording medium, which are treated as invalid media in the related art, if the predetermined data on these recording media is not readable at first, by changing the criterion, it becomes possible to read these recording media. As a result, even for a recording medium of low quality or a nonstandard recording medium, it becomes possible to locate the object lens to the target position, and thus, it is possible to precisely and stably control the position of the object lens relative to the recording medium.

In an embodiment, the third step may comprise a step of, if the predetermined data is not readable, switching to a criterion that includes reversing a polarity of the tracking error signal and controlling the position of the object lens based on the reversed-polarity tracking error signal.

In an embodiment, the third step may comprise a step of, if the predetermined data is not readable, switching to a criterion that includes shifting an on-track determination position in the tracking error signal by a predetermined amount for control of the position of the object lens. The on-track determination position is a position at which it is determined that an on-track condition occurs.

In an embodiment, the predetermined amount equals half of a wavelength of a waveform of the tracking error signal.

In an embodiment, the predetermined data may include an address data.

According to a fourth aspect of the present invention, there is provided a program executable on a computer for controlling an optical disk device that emits a light beam on a recording surface of a recording medium having a plurality of guide grooves and receives light reflected from the recording surface. The program comprises a first step of, in response to a control request for controlling a position of an object lens in a direction perpendicular to a tangential direction of a spiral track or of concentric tracks formed on the recording surface of the recording medium, trying to read a predetermined data recorded in the guide grooves or in a region between two of the guide grooves on the recording medium following a criterion for controlling the object lens based on a tracking error signal with respect to the guide grooves or the region between two of the guide grooves; a second step of determining whether or not the predetermined data is readable; and a third step of, according to whether or not the predetermined data is readable, switching the criterion and trying again to read the predetermined data recorded in the guide grooves or in the region between two of the guide grooves.

According to the present invention, a program of the present invention is loaded in a memory, and after a heading address of the program is set in a program counter, a computer for controlling an optical disk device, in response to a request for position control of an object lens in the tracking direction, attempts to read a predetermined data recorded in the guide grooves or in a region between two of the guide grooves on the recording medium following a criterion for controlling the object lens based on a tracking error signal with respect to the guide grooves or the region between two of the guide grooves. Depending on whether or not the predetermined data is readable, the computer changes the criterion and attempts again to read the predetermined data recorded in the guide grooves or in the region between two of the guide grooves. Thus, according to the program of the present invention, even when reading a low-quality recording medium or a nonstandard recording medium, which are treated as invalid media in the related art, if the predetermined data on these recording media is not readable at first, by changing the criterion, it becomes possible to read these recording media. As a result, even for a recording medium of low quality or a nonstandard recording medium, it becomes possible to locate the object lens to the target position, and thus, it is possible to precisely and stably control the position of the object lens relative to the recording medium.

According to a fifth aspect of the present invention, there is provided a position control device for controlling a position of an object lens in a direction perpendicular to a tangential direction of a spiral track or of concentric tracks formed on a recording surface of a recording medium without a guide groove. The position control device comprises a trial unit configured to try to read a predetermined data recorded on the recording medium; and a control unit configured to determine whether or not the predetermined data is readable, and according to whether or not the predetermined data is readable, to switch a criterion for controlling the position of the object lens based on a tracking error signal for control of the position of the object lens.

According to the present invention, when controlling a position of an object lens in the tracking direction relative to a recording medium without a guide groove, first, a trial unit attempts to read a predetermined data recorded on the recording medium, and then depending on whether or not the predetermined data is readable, a control unit changes a criterion for controlling the position of the object lens based on a tracking error signal. If the predetermined data is not readable, by changing the criterion, it becomes possible to read the predetermined data. As a result, even when reading a recording medium of low quality or a nonstandard recording medium, which are treated as invalid media and is not readable by standard methods in the related art, it becomes possible to read data thereon. As a result, it is possible to locate the object lens to the target position, and thus, it is possible to precisely and stably control the position of the object lens relative to the recording medium.

In an embodiment, if the predetermined data is not readable, the control unit switches to a criterion that includes reversing a polarity of the tracking error signal and controlling the position of the object lens based on the reversed-polarity tracking error signal.

In an embodiment, if the predetermined data is not readable, the control unit switches to a criterion that includes shifting an on-track determination position in the tracking error signal by a predetermined amount to control the position of the object lens. The on-track determination position is a position at which it is determined that an on-track condition occurs.

In an embodiment, the predetermined amount equals half of a wavelength of a waveform of the tracking error signal.

In an embodiment, the predetermined data includes an address data.

According to a sixth aspect of the present invention, there is provided a position control device for controlling a position of an object lens in a direction perpendicular to a tangential direction of a spiral track or of concentric tracks formed on a recording surface of a recording medium having a plurality of guide grooves. The position control device comprises a trial unit configured to try to read a predetermined data recorded in the guide grooves or in a region between two of the guide grooves on the recording medium following a criterion for controlling the object lens based on a tracking error signal with respect to the guide grooves or the region between two of the guide grooves; and a control unit configured to determine whether or not the predetermined data is readable, and according to whether or not the predetermined data is readable, to change the criterion and to try again to read the predetermined data recorded in the guide grooves or in a region between two of the guide grooves.

According to the present invention, when controlling a position of an object lens in a tracking direction relative to a recording medium having a plurality of guide grooves, first, a trial unit attempts to read a predetermined data recorded in the guide grooves or in a region between two of the guide grooves on the recording medium following a criterion for controlling the object lens based on a tracking error signal with respect to the guide grooves or a tracking error signal with respect to the region between two of the guide grooves, and then depending on whether or not the predetermined data is readable, a control unit changes the criterion and again attempts to read the predetermined data recorded in the guide grooves or in a region between two of the guide grooves. If the predetermined data is not readable, by changing the criterion, it becomes possible to read the predetermined data. As a result, even when reading a recording medium of low quality or a nonstandard recording medium, which are treated as invalid media and is not readable by standard methods in the related art, it becomes possible to read data thereon. As a result, it is possible to locate the object lens to the target position, and thus, it is possible to precisely and stably control the position of the object lens relative to the recording medium.

According to a seventh aspect of the present invention, there is provided an optical disk device for reproducing predetermined data on a recording medium without a guide groove. The optical disk device comprises a light source; an optical system that includes an object lens for condensing a light beam from the light source to a recording surface of the recording medium and directs a light beam reflected from the recording surface to a predetermined light reception position; a light detection unit arranged at the light reception position; a position control device for controlling a position of the object lens in a direction perpendicular to a tangential direction of a spiral track or of concentric tracks formed on the recording surface of the recording medium; and a processing unit configured to perform reproducing the predetermined data on a recording medium.

The position control device comprises a trial unit configured to try to read a predetermined data recorded on the recording medium; and a control unit configured to determine whether or not the predetermined data is readable, and according to whether or not the predetermined data is readable, to switch a criterion for controlling the position of the object lens based on a tracking error signal for control of the position of the object lens.

According to the present invention, by including a position control device in an optical disk device of the present invention, it is possible to precisely and stably control a position of an object lens relative to a recording medium. Consequently, it is possible to precisely and stably perform recording operation, reproduction operation, and deletion operations, or at least the reproduction operation.

According to an eighth aspect of the present invention, there is provided an optical disk device for reproducing predetermined data on a recording medium having a plurality of guide grooves. The optical disk device comprises a light source; an optical system that includes an object lens for condensing a light beam from the light source to a recording surface of the recording medium and directs a light beam reflected from the recording surface to a predetermined light reception position; a light detection unit arranged at the light reception position; a position control device for controlling a position of the object lens in a direction perpendicular to a tangential direction of a spiral track or of concentric tracks formed on the recording surface of the recording medium; and a processing unit configured to perform reproducing the predetermined data on a recording medium.

The position control device comprises a trial unit configured to try to read a predetermined data recorded in the guide grooves or in a region between two of the guide grooves on the recording medium following a criterion for controlling the object lens based on a tracking error signal with respect to the guide grooves or the region between two of the guide grooves; and a control unit configured to determine whether or not the predetermined data is readable, and according to whether or not the predetermined data is readable, to change the criterion and to try again to read the predetermined data recorded in the guide grooves or in a region between two of the guide grooves.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 4:
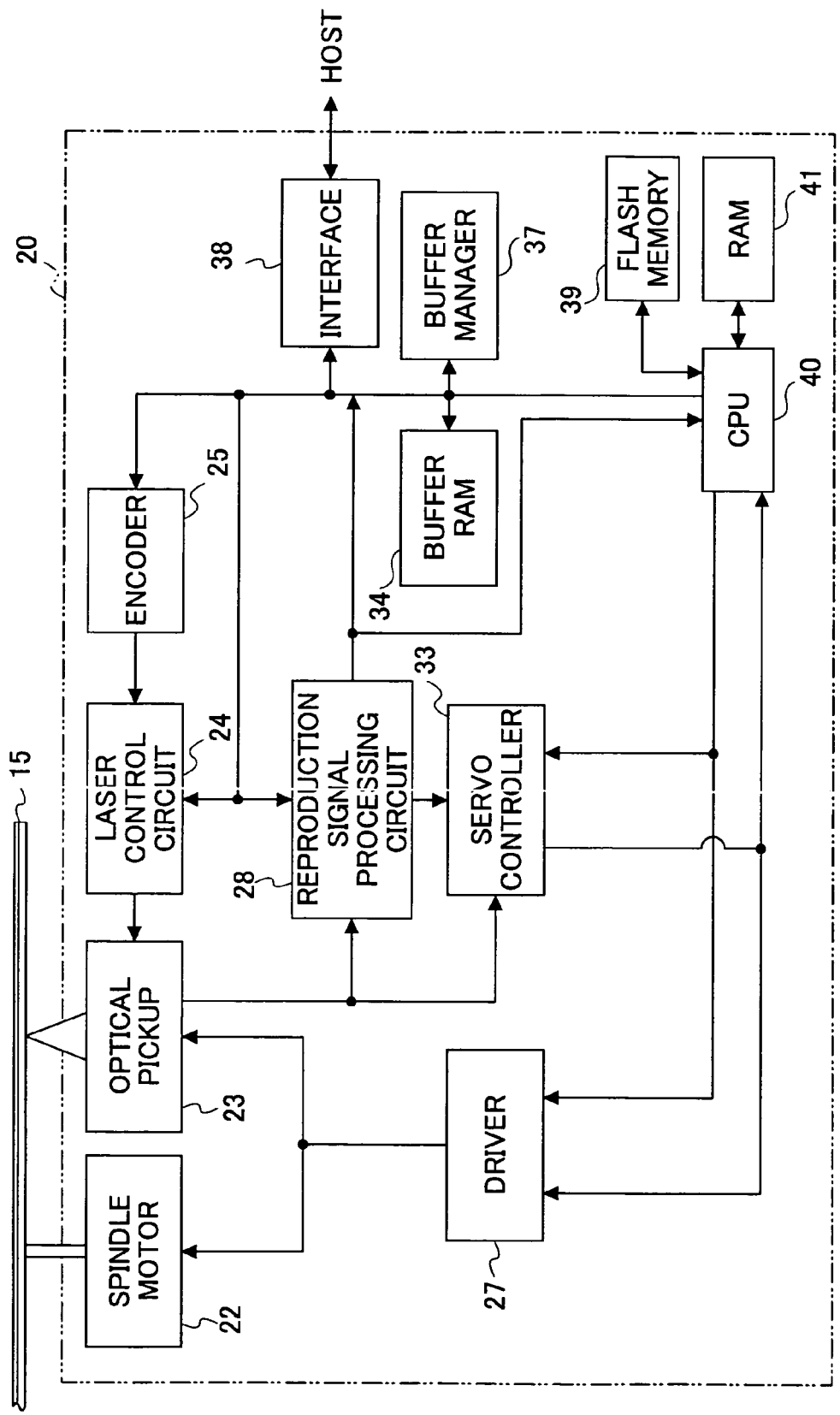
FIG. 4 is a block diagram showing a schematic configuration of an optical disk device according to an embodiment of the present invention.

FIG. 4 is a diagram showing a schematic configuration of an optical disk device 20 according to an embodiment of the present invention.

The optical disk device 20 shown in FIG. 4 includes a spindle motor 22 to drive an optical disk 15 (an example of a recording medium) to rotate, an optical pickup 23, a laser controller circuit 24, an encoder 25, a driver 27, a reproduction signal processing circuit 28, a servo controller 33, a buffer RAM 34, a buffer manager 37, an interface 38, a flash memory 39, a CPU 40, and a RAM 14.

In FIG. 4, the arrows indicate the transmission direction of primary signals and data, but not the detailed connection relation between elements.

The optical disk device 20 can deal with recording media in compliance with the DVD standards (abbreviated as "DVD" below), and recording media in compliance with the CD standards (abbreviated as "CD" below).

The optical pickup 23 emits a laser beam to a recording surface of the optical disk 15, on which spiral tracks or concentric tracks are formed (recording region), and receives light reflected from the recording surface. The configuration of the optical pickup 23 is described below.

Figure 5:
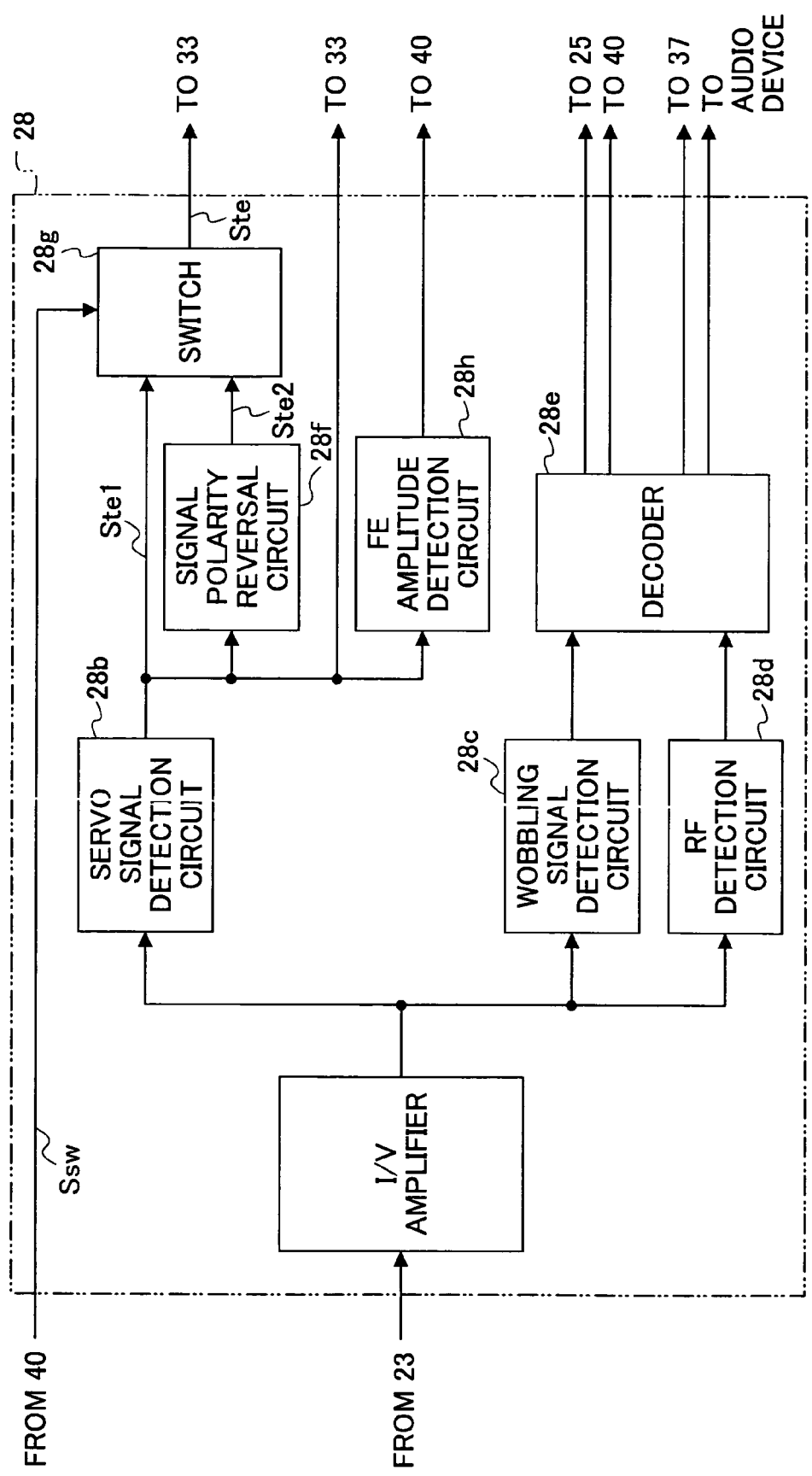
FIG. 5 is a block diagram showing a configuration of the reproduction signal processing circuit 28 in FIG. 4.

FIG. 5 is a diagram showing a configuration of the reproduction signal processing circuit 28 in FIG. 4.

As shown in FIG. 5, the reproduction signal processing circuit 28 includes an I/V amplifier 28a, a servo signal detection circuit 28b, a wobbling signal detection circuit 28c, a RF detection circuit 28d, a decoder 28e, a signal polarity reversal circuit 28f, a switch 28g, and an FE amplitude detection circuit 28h.

The I/V amplifier 28a converts the output signal of the optical pickup 23, which is a current signal, to a voltage signal, and amplifies the voltage signal by a specified gain.

The servo signal detection circuit 28b detects a servo signal, such as a focus error signal, and/or a tracking error signal, based on the output signal of the optical pickup 23.

As for the methods of detecting the tracking error signal, when the optical disk 15 is a DVD, the so-called differential push-pull (DPP) method is used, and when the optical disk 15 is a CD, the aforementioned three-spot method is used. In the differential push-pull method, the light beam emitted from the light source is divided into a main beam and two sub-beams. When these beams irradiate on the recording surface, the spots of these beams are respectively shifted in the tracking direction by ½ of a track pitch. After being reflected by the recording surface, the returning light beams of the main beam and two sub-beams are received by three two-division light reception elements, and the three two-division light reception elements output push-pull signals. The difference between the push-pull signal related to the main beam and the push-pull signal related to the two sub-beams is defined as the track error signal.

The wobbling signal detection circuit 28c detects the wobbling signal based on the output signal of the optical pickup 23.

The RF detection circuit 28d detects the RF signal based on the output signal of the optical pickup 23.

The decoder 28e extracts address data and a synchronization signal from the wobbling signal detected by the wobbling signal detection circuit 28c. The extracted address data are output to the CPU 40, and the synchronization signal is output to the encoder 25. The decoder 28e decodes the RF signal and corrects errors in the RF signal detected by the RF detection circuit 28d. After that, the RF signal is stored in the buffer RAM 34 as reproduction data through the buffer manager 37. If the reproduction data is audio data, the reproduction data is output to an external audio device.

The signal polarity reversal circuit 28f reverses the polarity of the tracking error signal Ste1 detected by the servo signal detection circuit 28b.

Figure 6:
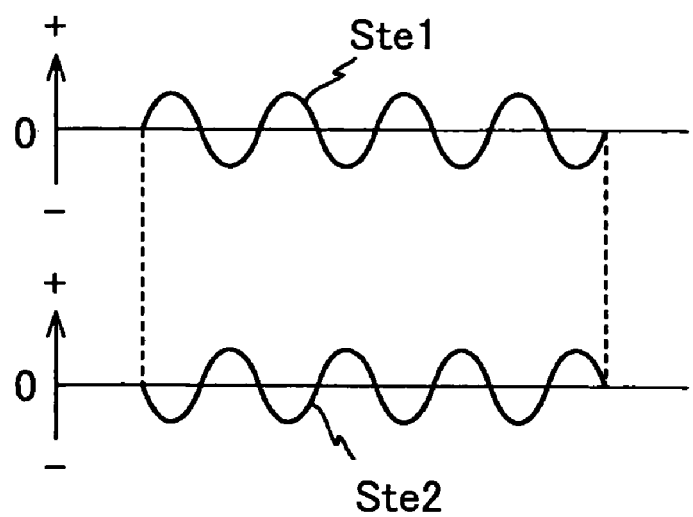
FIG. 6 shows signal waveforms for explaining functions of the signal polarity reversal circuit 28f in FIG. 5.

FIG. 6 shows signal waveforms for explaining functions of the signal polarity reversal circuit 28f in FIG. 5.

As shown in FIG. 6, the polarity of the tracking error signal Ste1 is reversed by the signal polarity reversal circuit 28f, resulting in another tracking error signal Ste2.

Referring again to FIG. 5, the switch 28g, in response to a switching signal Ssw from the CPU 40, selects one of the tracking error signal Ste1 from the servo signal detection circuit 28b and the reversed-polarity tracking error signal Ste2 from the signal polarity reversal circuit 28f, and outputs a tracking error signal Ste to the servo controller 33. For example, the switch 28g can be set to select the tracking error signal Ste1 when the switching signal Ssw is zero, and selects the reversed-polarity tracking error signal Ste2 when the switching signal Ssw is one, and under a default condition, the switch 28g selects the tracking error signal Ste1.

In addition to the tracking error signal Ste1 detected by the servo signal detection circuit 28b, other servo signals are also output from the servo signal detection circuit 28b to the servo controller 33.

The FE amplitude detection circuit 28h detects the amplitude of the focus error signal (FE) detected by the servo signal detection circuit 28b. The obtained amplitude of the focus error signal is output to the CPU 40.

Figure 7A:
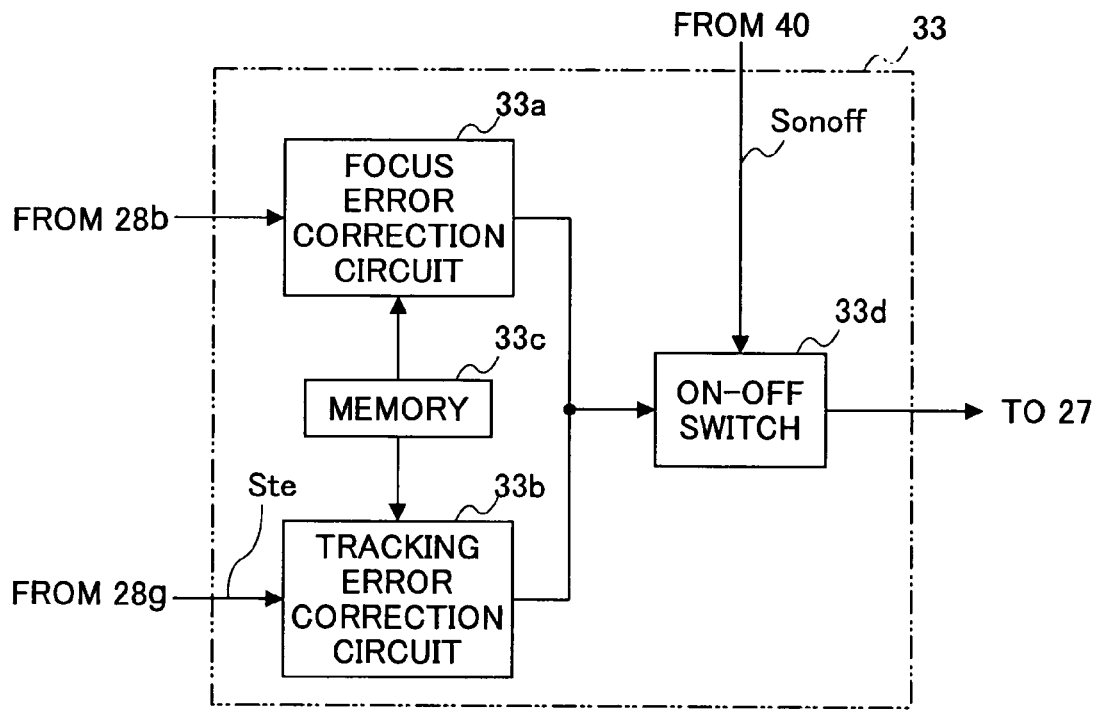
FIG. 7A is a block diagram showing a configuration of the servo controller 33 in FIG. 4.
Figure 7B:
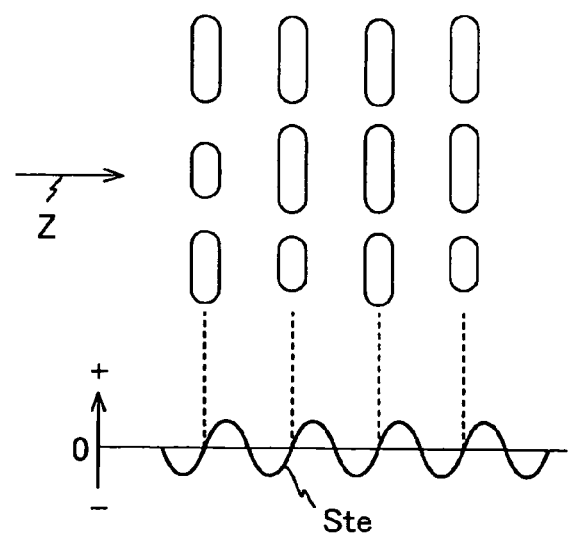
FIG. 7B is a diagram schematically showing the method of determining the on-track determination position by using the tracking error signal.

FIG. 7A is a block diagram showing a configuration of the servo controller 33 in FIG. 4, and FIG. 7B is a diagram schematically showing the method of determining the on-track determination position in the tracking error signal.

As shown in FIG. 7A, the servo controller 33 includes a focus error correction circuit 33a, a tracking error correction circuit 33b, a memory 33c, and an ON-OFF switch 33d. In the memory 33c, there are stored information related to a focus determining position in the focus error signal (referred to as "focus servo information" below), and information related to an on-track determination position in the tracking error signal (referred to as "tracking servo information" below), and other data.

For example, as shown in FIG. 7B, when the object lens is moved in the +Z direction, that is, the rotational axis direction of the optical disk 15, the level of the tracking error signal Ste increases gradually. When the level of the tracking error signal Ste becomes zero (that is, at the zero-crossing point), it indicates an on-track condition occurs, that is, the light spot of the main beam is at the track position.

When the object lens is moved in the –Z direction, the level of the tracking error signal Ste decreases gradually. When the level of the tracking error signal Ste becomes zero (that is, at the zero-crossing point), it indicates that the on track condition occurs, that is, the light spot of the main beam is at the track position.

The focus error correction circuit 33a generates a control signal for correcting a focus offset based on the focus error signal from the servo signal detection circuit 28b and the focus servo information stored in the memory 33c.

The tracking error correction circuit 33b generates a control signal for correcting off-track based on the tracking error signal Ste from the switch 28g and the tracking servo information stored in the memory 33c.

The ON-OFF switch 33d selects one of an ON state and an OFF state according to an ON-OFF signal from the CPU 40. When the ON state is selected, the control signals generated by the focus error correction circuit 33a or the tracking error correction circuit 33b are output to the driver 27, and when the OFF state is selected, the control signals generated by the focus error correction circuit 33a or the tracking error correction circuit 33b are not output to the driver 27.

Referring to FIG. 4, the driver 27 drives the spindle motor 22 and a driving system (not-illustrated) of the optical pickup 23 based on control signals from the servo controller 33 and directions from the CPU 40.

The buffer manager 37 manages input and output of the buffer RAM 34, and notifies the CPU 40 when the amount of data accumulated in the buffer RAM 34 becomes a preset value.

The encoder 25 reads out data stored in the buffer RAM 34 based on directions from the CPU 40 via the buffer manager 37, modulates the data and appends error correction codes to the data, and then generates a write signal to enable an operation of writing data to the optical disk 15, and outputs the write signal to the laser controller circuit 24 in synchronization with the synchronization signal from the reproduction signal processing circuit 28.

The laser controller circuit 24 outputs a control signal, which controls output of a laser beam irradiating the optical disk 15, to the optical pickup 23, based on the write signal from the encoder 25 and directions from the CPU 40. Further, based on directions from the CPU 40, the laser controller circuit 24 determines the light source that is to be controlled for use (refer to FIG. 8B to be described below).

The interface 38 is for bi-directional communication between the optical disk device 20 and a host (for example, a computer), for example, being compliance with the ATAPI (AT Attachment Packet Interface) standards.

The flash memory 39 is a nonvolatile memory, having a program region and a data region. In the program region, there is stored the program according to the present invention for position control of the object lens 60. This program, referred to as "position control program" below, is created using codes readable by the CPU 40.

In the data region, there are stored various kinds of information used for identifying the type of an optical disk (below, referred to as "identification information"), for example, a reference amplitude (denoted by Wcd) of the focus error signal of a CD, and a reference amplitude (denoted by Wdvd) of the focus error signal of a DVD, and others. This identification information can be modified from the host, or other external devices.

Further, in the data region, there is stored information related to the seek operation for each type of optical disks (below, referred to as "seek information").

Because the flash memory 39 is a nonvolatile memory, the CPU 40 can write data to or read data from the flash memory 39, and the data stored in the flash memory 39 can be sustained even after the power supply is stopped.

The CPU 40 controls the above elements in accordance with the programs stored in the flash memory 39, and stores data necessary for operations in the RAM 41 temporarily.

Figure 8A:
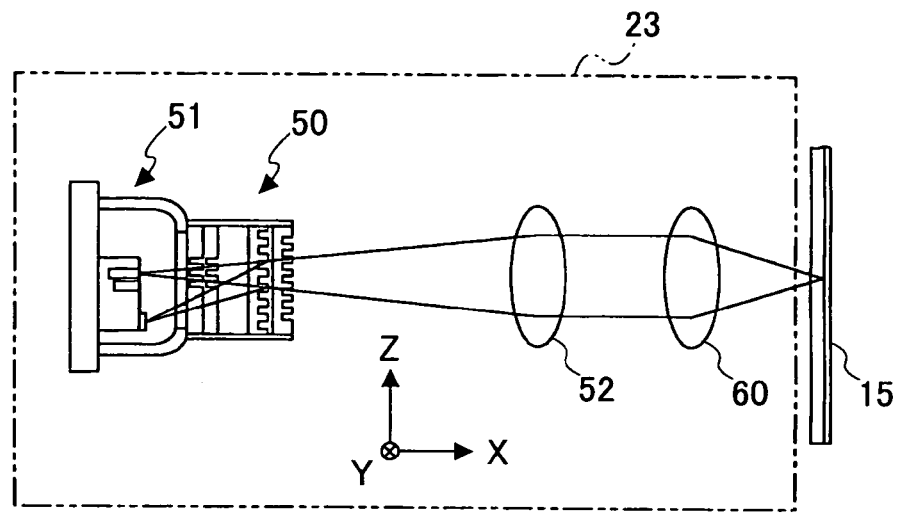
FIG. 8A is a schematic view of a configuration of the optical pickup 23 shown in FIG. 4.
Figure 8B:
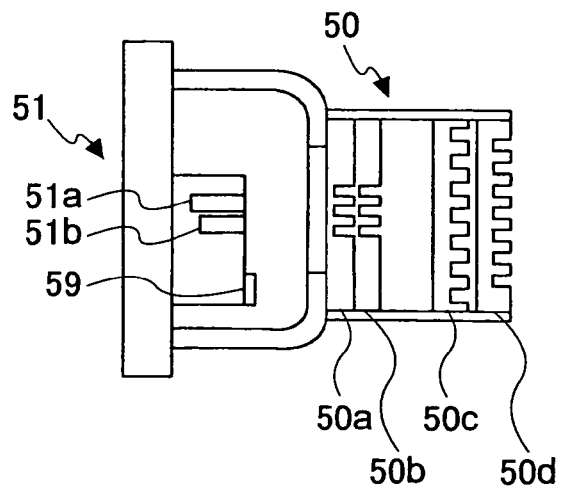
FIG. 8B is a schematic view of a module for light emission and light reception installed in the optical pickup 23.

FIG. 8A is a schematic view of a configuration of the optical pickup 23 shown in FIG. 4, and FIG. 8B is a schematic view of a module 51 for light emission and light reception installed in the optical pickup 23.

As shown in FIG. 8A, the optical pickup 23 includes the light emission and reception module 51, a diffraction element 50, a collimation lens 52, an object lens 60, and a not-illustrated driving system. The driving system, for example, includes a focusing actuator, a tracking actuator, and a seek motor. The focusing actuator is a device for slightly moving the object lens in the direction of the optical axis (focus direction), and the tracking actuator is a device for slightly moving the object lens in the tracking direction. The seek motor moves the optical pickup 23 in the radial direction of the optical disk 15. In the present embodiment, "X" is used to indicate the focus direction, "Z" is used to indicate the tracking direction and the radial direction of the optical disk 15.

As shown in FIG. 8B, for example, the light emission and reception module 51 includes a semiconductor laser 51a, acting as a light source emitting a laser having a wavelength of 650 nm, a semiconductor laser 51b, acting as a light source emitting a laser having a wavelength of 780 nm, and a light reception unit 59, acting as a light detector for receiving a returning light beam. The semiconductor laser 51a is selected for use when the optical disk 15 is a DVD, and the semiconductor laser 51b is selected for use when the optical disk 15 is a CD.

The light reception unit 59 is arranged near the semiconductor lasers 51a and 51b, to receive the returning light beams, which are light beams diffracted by the diffraction element 50. The light reception unit 59 includes a number of light reception elements, and is configured so that for the 650 nm light beam, the differential push-pull method is used to detect the tracking error signal, and for the 780 nm light beam, the three-spot method is used to detect the tracking error signal.

The diffraction element 50 is placed on the +X side of the light emission and reception module 51, and, as shown in FIG. 8B, includes two gratings 50a and 50b, and two holograms 50c and 50d.

The grating 50a is arranged closest to the light emission and reception module 51; the grating 50a diffracts the 650 nm light beam emitted from the light emission and reception module 51 into three beams, specifically, a zero-th light beam, a +1st light beam, and a −1st light beam. If the optical disk 15 is a DVD, the grating 50a is set so that the light spots of the +1st light beam and the −1st light beam are respectively located at positions shifted by a half of the track pitch in the tracking direction from a center of the light spot of the zero-th light beam.

The grating 50b is arranged on the +X side of the grating 50a; the grating 50b diffracts the 780 nm light beam emitted from the light emission and reception module 51 into three beams, specifically, the zero-th light beam, the +1st light beam, and the −1st light beam. If the optical disk 15 is a CD, the grating 50b is set so that the light spots of the +1st light beam and the −1st light beam are respectively located at positions shifted by a quarter of the track pitch in the tracking direction from a center of the light spot of the zero-th light beam.

The hologram 50c is arranged on the +X side of the grating 50b; the hologram 50c diffracts the returning 650 nm light beam, that is, the 650 nm light beam reflected by the recording surface of the optical disk 15, to the light reception surface of the light reception unit 59.

The hologram 50d is arranged on the +X side of the hologram 50c; the hologram 50d diffracts the returning 780 nm light beam, that is, the 780 nm light beam reflected by the recording surface of the optical disk 15, to the light reception surface of the light reception unit 59.

Each of the hologram 50c and the hologram 50d is made to be an integral one while taking into account of deviations of the light emitting spots in each of the semiconductor laser 51a and the semiconductor laser 51b. Typically, deviations of the light emitting spots in a semiconductor laser is in the range from 50 μm to 300 μm.

In order that the diffracted light beams from the holograms 50c and 50d are not further diffracted by the gratings 50a and 50b, for example, positions of the holograms 50c and 50d are adjusted so that the interval between the holograms 50c, 50d and the gratings 50a, 50b is, for example, in the range from 1.5 mm to 2.0 mm or so.

The collimation lens 52 is arranged on the +X side of the diffraction element 50 to make each of the three light beams from the diffraction element 50 into a nearly parallel light beam. The object lens 60 is arranged on the +X side of the collimation lens 52; the object lens 60 condenses the light beams through the collimation lens 52, and forms light spots on the recording surface of the optical disk 15.

Next, an explanation is made of the operation of the optical pickup 23 having the above configuration. First, it is assumed that the optical disk 15 is a DVD.

The light beam emitted from the semiconductor laser 51a, that is, the 650 nm laser beam, is diffracted by the grating 50a into the zero-th light beam, the +1st light beam, and the −1st light beam. After these light beams pass through the grating 50b, the hologram 50c, and the hologram 50d, the light beams are converted into nearly parallel light beams by the collimator lens 52; then the light beams are condensed through the object lens 60 and form small light spots on the recording surface of the optical disk 15.

The returning light beams, that is, the light beams reflected by the recording surface of the optical disk 15 are converted into nearly parallel light beams by the object lens 60, and after passing through the collimator lens 52, the returning light beams enter into the diffraction element 50. In the diffraction element 50, the returning light beams pass through the hologram 50d, are diffracted by the hologram 50c, and are received by the light reception unit 59. Each light reception element in the light reception unit 59 generates a current signal corresponding to the amount of light it receives, and outputs the current signal to the reproduction signal processing circuit 28.

Next, an explanation is made of the operation of the optical pickup 23 when the optical disk 15 is a CD.

The light beam emitted from the semiconductor laser 51b, that is, the 780 nm laser beam, passes through the grating 50a, and is diffracted by the grating 50b into the zero-th light beam, the +1st light beam, and the −1st light beam. After these light beams pass through the hologram 50c and the hologram 50d, the light beams are converted into nearly parallel light beams by the collimator lens 52; then the light beams are condensed through the object lens 60 and form small light spots on the recording surface of the optical disk 15.

The returning light beams, that is, the light beams reflected by the recording surface of the optical disk 15 are converted into nearly parallel light beams by the object lens 60, and after passing through the collimator lens 52, the returning light beams enter the diffraction element 50. The returning light beams incident on the diffraction element 50 pass the hologram 50d, diffracted by the hologram 50d, and are received by the light reception unit 59. Each light reception element in the light reception unit 59 generates a current signal corresponding to the amount of light it receives, and outputs the current signal to the reproduction signal processing circuit 28.

Next, an explanation is made of an operation of the optical disk device 20 for identifying the type of optical disk 15 after the optical disk 15 is loaded in the optical disk device 20.

Figure 9:
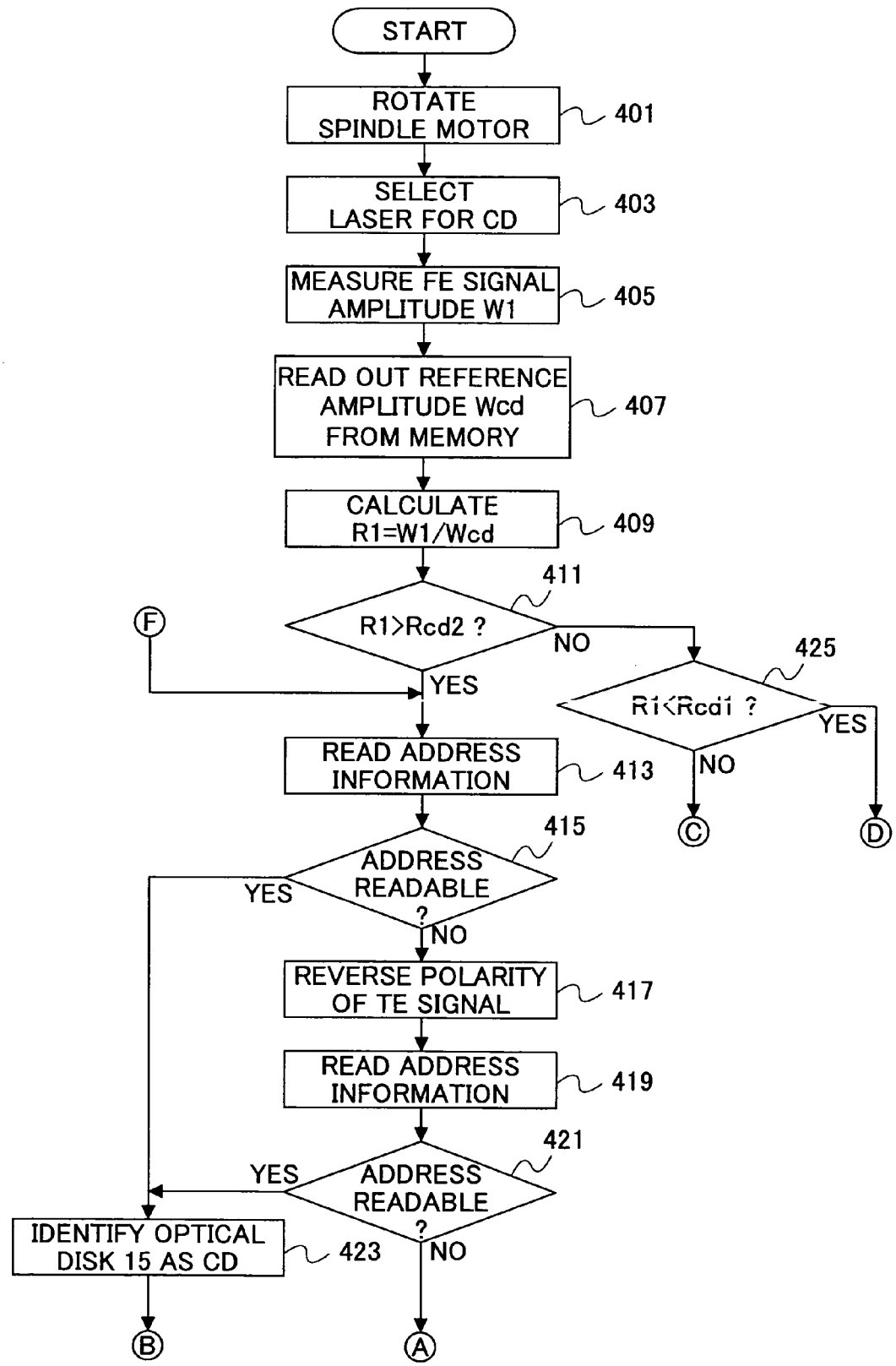
FIG. 9 is a flowchart showing an operation of identifying the type of optical disk 15.

FIG. 9 is a flowchart showing an operation for identifying the type of optical disk 15.

Figure 10:
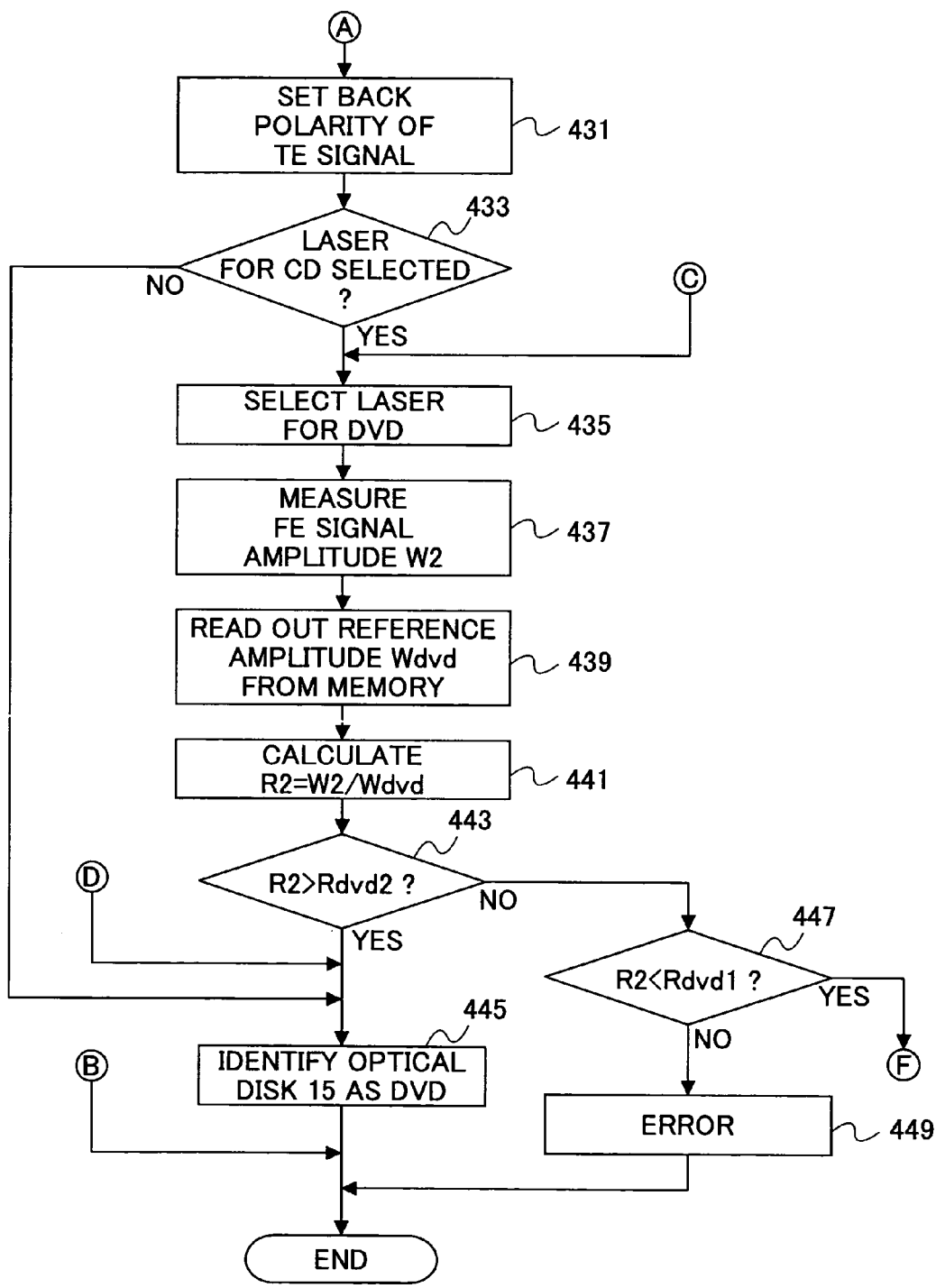
FIG. 10 is a flowchart, continuing from FIG. 9, showing the operation of identifying the type of optical disk 15.

FIG. 10 is a flowchart, continuing from FIG. 9, showing the operation of identifying the type of optical disk 15.

The flowcharts in FIG. 9 and FIG. 10 correspond to a series of algorithms executed by the CPU 40. When it is detected that the optical disk 15 is loaded in the optical disk device 20, a heading address of the program corresponding to the flowcharts in FIG. 9 and FIG. 10 is set in a program counter of the CPU 40, and the computer starts the identification operation. Here, it is assumed that the switching signal Ssw and the ON-OFF signal Sonoff are initially set to zero.

As shown in FIG. 9, in step 401, a control signal is output to the spindle motor 22 to rotate the optical disk 15 at a specified linear velocity, for example, at the reference speed (one-time-speed).

In step 403, the laser controller circuit 24 is directed to control the semiconductor laser 51b, which is used for a CD, to emit a laser beam at a specified reproduction power.

In step 405, using the focusing actuator, the object lens 60 is moved from a preset reference position to approach the optical disk 15 and to recede from the optical disk 15, and at the same time, the amplitude of the focus error signal is measured by using the FE amplitude detection circuit 28*h*. Here, the measured amplitude of the focus error signal is represented by W1.

In step 407, the reference amplitude Wcd of the focus error signal stored in the flash memory 39 is read out.

In step 409, an amplitude ratio R1 is calculated based on the following formula (1).

$$R1 = W1/Wcd \qquad (1)$$

In step 411, it is determined whether or not the amplitude ratio R1 is greater than a preset value Rcd2. The value Rcd2 is stored in the flash memory 39 as one item of the identification information.

If the amplitude ratio R1 is greater than Rcd2, the ON-OFF signal is set to one, and the routine proceeds to step 413.

If the amplitude ratio R1 is not greater than Rcd2, the routine proceeds to step 425.

In step 413, an address acquisition operation is performed based on the address information from the reproduction signal processing circuit 28, in other words, it is attempted to read address data at the location on the optical disk 15 specified by the address information given by the reproduction signal processing circuit 28.

In step 415, it is determined whether or not the address is readable in step 413, in other words, whether or not the address of the specified location is readable in step 413. If the address is not readable, the routine proceeds to step 417. If the address is readable, the routine proceeds to step 423.

In step 417, the polarity of the tracking error signal output to the servo controller 33 is reversed. Specifically, because the switching signal Ssw is initially set to zero, here, the switching signal Ssw is set to one so that the switch 28*g* selects the tracking error signal Ste2, that is, to reverse the polarity of the tracking error signal output to the servo controller 33. If presently the switching signal Ssw is one, in this step, the switching signal Ssw is set to zero to reverse the polarity of the tracking error signal output to the servo controller 33.

In step 419, an address acquisition operation is performed again based on the address information from the reproduction signal processing circuit 28, that is, it is attempted again to read address data at the location on the optical disk 15 specified by the address information given by the reproduction signal processing circuit 28.

In step 421, it is determined whether or not the address is readable in step 419. If the address is readable, the routine proceeds to step 423. If the address is not readable, the routine proceeds to step 431.

In step 423, the optical disk 15 is identified to be a CD, and the identification process is completed.

In step 425, it is determined whether or not the amplitude ratio R1 is less than a preset value Rcd1. The value Rcd1 is stored in the flash memory 39 as one item of the identification information.

If the amplitude ratio R1 is less than Rcd1, the routine proceeds to step 445. That is, the optical disk 15 is identified to be a DVD.

If the amplitude ratio R1 is not less than Rcd1, the routine proceeds to step 435.

As shown in FIG. 10, in step 431, the switching signal Ssw is set to zero so that the switch 28*g* selects the tracking error signal Ste1. That is, the tracking error signal output to the servo controller 33 has a normal polarity.

In step 433, it is determined whether the semiconductor laser in present use is the semiconductor laser 51*b*, which is used for a CD.

If the semiconductor laser presently used is the semiconductor laser 51*b*, the ON-OFF signal Sonoff is set to zero, and the routine proceeds to step 435.

If the semiconductor laser presently used is the semiconductor laser 51*a*, which is used for a DVD, the routine proceeds to step 445.

In step 435, the laser controller circuit 24 is directed to control the semiconductor laser 51*a*, which is used for a DVD, to emit a laser beam at a specified reproduction power.

In step 437, the same as step 405, using the focusing actuator, the object lens 60 is moved from a preset reference position to approach the optical disk 15 and to recede from the optical disk 15, and at the same time, the amplitude of the focus error signal is measured by using the FE amplitude detection circuit 28*h*. Here, the measured amplitude of the focus error signal is represented by W2.

In step 439, the reference amplitude Wdvd of the focus error signal stored in the flash memory 39 is read out.

In step 441, an amplitude ratio R2 is calculated based on the following formula (2).

$$R2 = W2/Wdvd \qquad (2)$$

In step 443, it is determined whether or not the amplitude ratio R2 is greater than a preset value Rdvd2. The value Rdvd2 is stored in the flash memory 39 as one item of the identification information. If the amplitude ratio R2 is greater than Rdvd2, the routine proceeds to step 445. If the amplitude ratio R2 is not greater than Rdvd2, the routine proceeds to step 447.

In step 445, the optical disk 15 identified to be a DVD, and the identification process is completed.

In step 447, it is determined whether or not the amplitude ratio R2 is less than a preset value Rdvd1. The value Rdvd1 is stored in the flash memory 39 as one item of the identification information.

If the amplitude ratio R2 is less than Rdvd1, the ON-OFF signal Sonoff is set to one, and then, the routine proceeds to step 413. If the amplitude ratio R2 is not less than Rdvd1, the routine proceeds to step 449.

In step 449, it is determined that the optical disk 15 is not supported by the optical disk device 20 and the operation on it is invalid. Then an error message is sent to the host, and the identification process is completed.

Next, the reproduction operation of the optical disk device 20 is explained.

Figure 11:
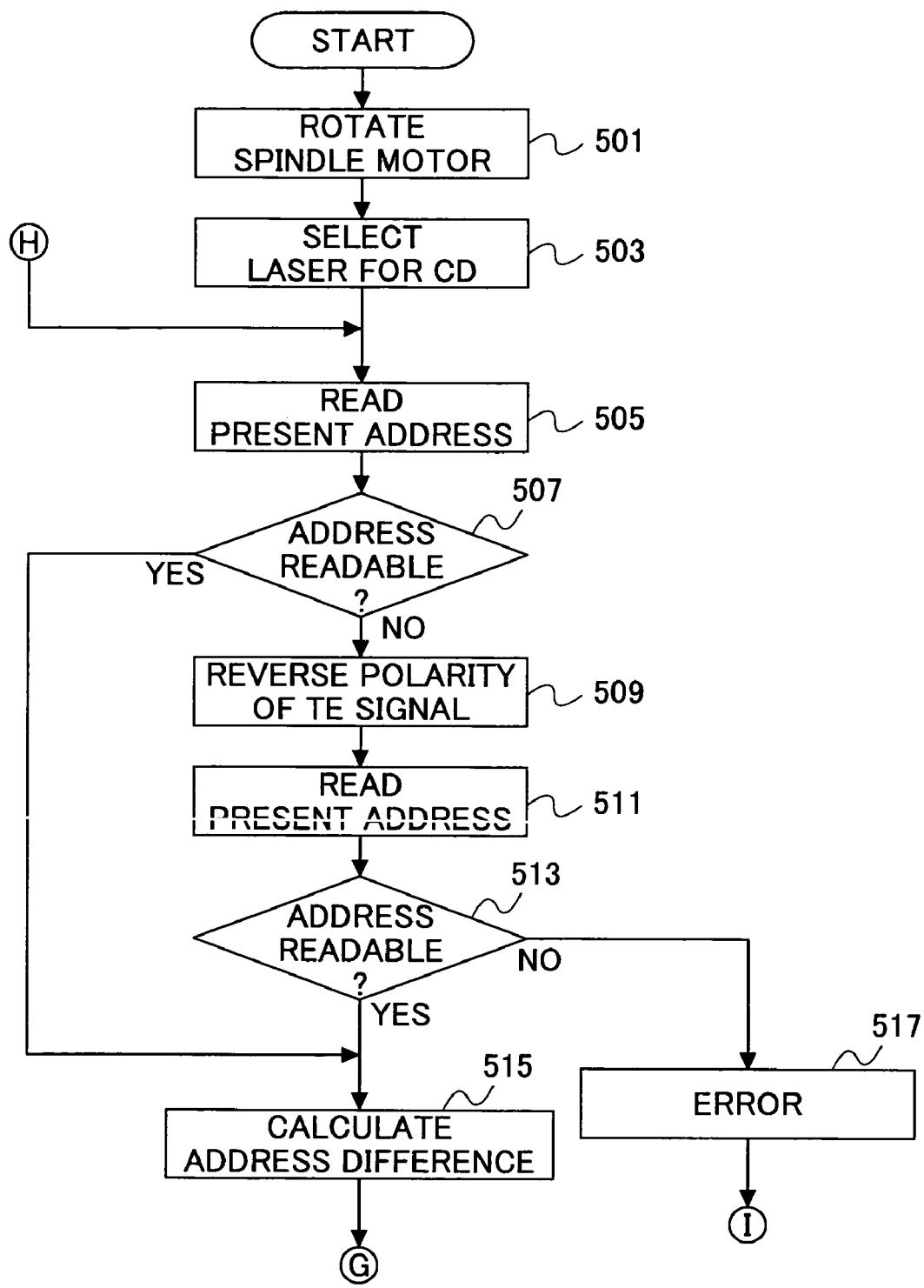
FIG. 11 is a flowchart showing an operation of reproducing data recorded on the optical disk 15.

FIG. 11 is a flowchart showing an operation of reproducing data recorded on the optical disk 15.

Figure 12:
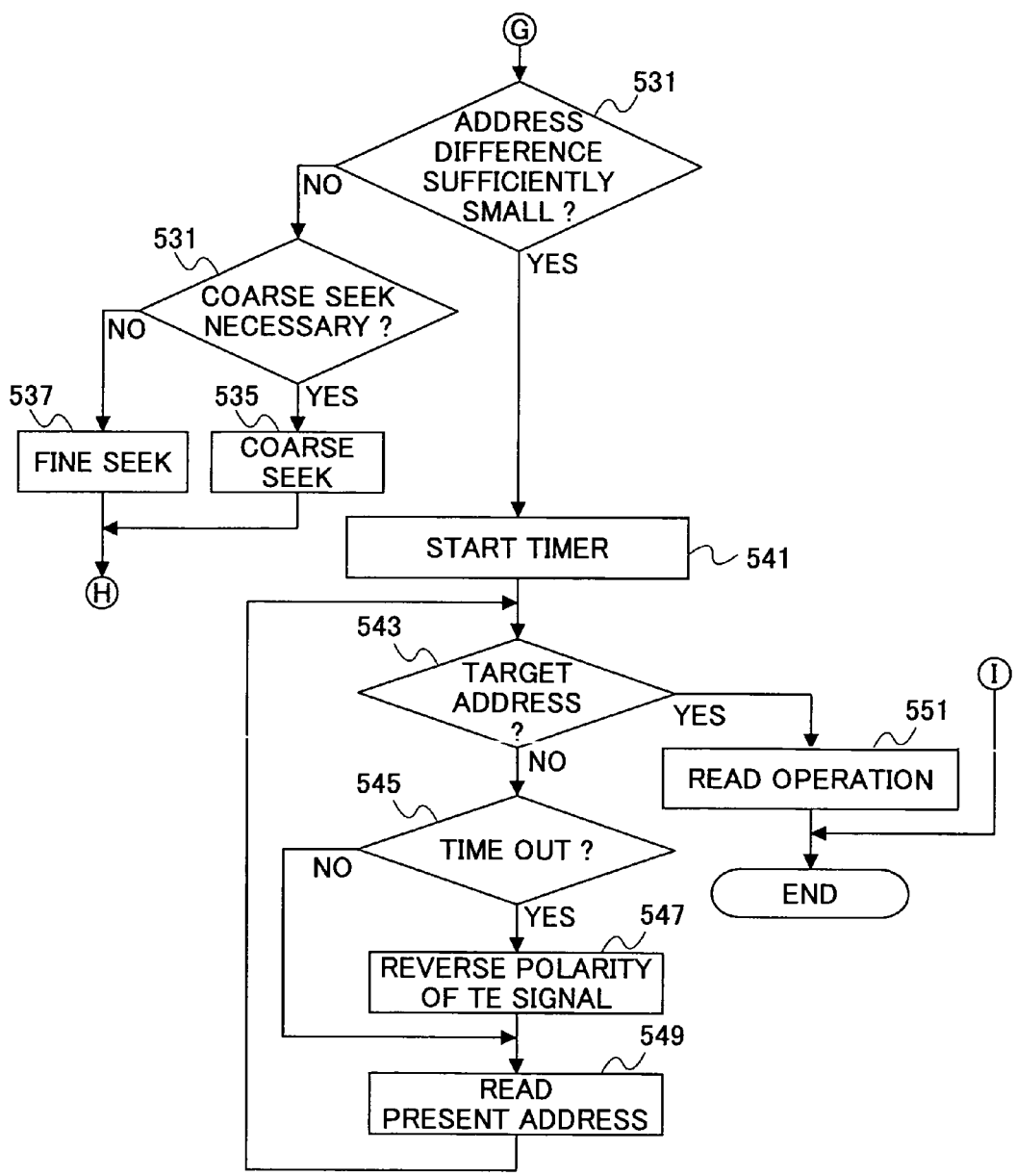
FIG. 12 is a flowchart, continuing from FIG. 11, showing the operation of reproducing data recorded on the optical disk 15.

FIG. 12 is a flowchart, continuing from FIG. 11, showing the operation of reproducing data recorded on the optical disk 15.

The flowcharts in FIG. 11 and FIG. 12 correspond to a series of algorithms executed by the CPU 40. When a command for requesting reproduction operation is received from the host, a heading address of the program corresponding to the flowcharts in FIG. 11 and FIG. 12 is set in the program counter of the CPU 40, and the computer starts the reproduction operation. Here, it is assumed that the switching signal Ssw and the ON-OFF signal Sonoff are initially set to zero.

As shown in FIG. 11, in step 501, a control signal is output to the driver 27 to control rotation of the spindle motor 22 based on a reproduction speed, and a message is sent to the reproduction signal processing circuit 28 indicating that a reproduction request is received from the host.

In step 503, the laser controller circuit 24 is directed to control one of the semiconductor laser 51*b* for CD use and the semiconductor laser 51*a* for DVD use according to the type of optical disk 15 to emit a laser beam at a specified reproduction power. Here, it is assumed that the semiconductor laser 51b for CD use is selected.

When the rotation speed of the optical disk 15 reaches a specified linear velocity, the ON-OFF signal is set to one. Due to this, it is possible to perform tracking control for correcting off-track and focus control for correcting the focus offset at any time.

From the reproduction signal processing circuit 28, address information is sent to the CPU 40 at each specified time.

In step 505, an operation for acquiring the present address is performed based on the address information from the reproduction signal processing circuit 28, that is, it is attempted to read address data at the location on the optical disk 15 specified by the address information given by the reproduction signal processing circuit 28.

In step 507, it is determined whether or not the address is readable in step 505. If the address is not readable, the routine proceeds to step 509. If the address is readable, the routine proceeds to step 515.

In step 509, the polarity of the tracking error signal output to the servo controller 33 is reversed. Specifically, because the switching signal Ssw is initially set to zero, here, the switching signal Ssw is set to one so that the switch 28g selects the tracking error signal Ste2, that is, to reverse the polarity of the tracking error signal output to the servo controller 33. If the switching signal Ssw is one at present, here, the switching signal Ssw should be set to zero to reverse the polarity of the tracking error signal output to the servo controller 33.

In step 511, an operation for acquiring the present address is performed based on the address information from the reproduction signal processing circuit 28, that is, it is attempted to read address data at the location on the optical disk 15 specified by the address information given by the reproduction signal processing circuit 28.

In step 513, it is determined whether or not the address is readable in step 511. If the address is readable, the routine proceeds to step 515. If the address is not readable, the routine proceeds to step 517.

In step 515, a calculation is made to obtain a difference between the present address and the target address extracted from the command for the reproduction request. Below, this difference is referred to as "address difference"

In step 517, after error processing, the reproduction operation is ended.

Subsequently, as shown in FIG. 12, in step 531, it is determined whether or not the address difference obtained in step 515 is sufficiently small, specifically, within a preset permitted range. If the address difference is within the permitted range, the routine proceeds to step 541. If the address difference is not within the permitted range, the routine proceeds to step 533.

In step 533, referring to a threshold value as one item of the seek information stored in the flash memory 39, it is determined whether or not a coarse seek operation is necessary. If the address difference exceeds the threshold, the routine proceeds to step 535. If the address difference is below the threshold, the routine proceeds to step 537.

In step 535, the seek motor is operated to perform a coarse seek operation. Then, the routine returns to step 505 in FIG. 11.

In step 537, the tracking actuator is operated to perform a fine seek operation. Then, the routine returns to step 505 in FIG. 11.

In step 541, a timer is started. Specifically, a timer counter is set to zero, and the timer counter is allowed to operate. Then, the timer counter starts to count by means of timer interruption.

In step 543, it is determined whether or not the present address is in agreement with the target address. If the present address is not in agreement with the target address, the routine proceeds to step 545. If the present address is in agreement with the target address, the routine proceeds to step 551.

In step 545, referring to the value of the timer counter, it is determined whether or not time-out occurs. If time-out does not occur, the routine proceeds to step 549. If time-out occurs, the routine proceeds to step 547.

In step 547, which is the same as step 509, the polarity of the tracking error signal Ste output to the servo controller 33 is reversed. Then, the routine proceeds to step 549.

In step 549, an operation for acquiring the present address is performed based on the address information from the reproduction signal processing circuit 28, that is, it is attempted to read address data at the location on the optical disk 15 specified by the address information given by the reproduction signal processing circuit 28. Then, the routine returns to step 543.

In step 551, by the RF detection circuit 28d and the decoder 28e, reproduction data are obtained, and are stored in the buffer RAM 34. When the reproduction data fill one sector of the buffer RAM 34, the buffer manager 37 transmits the reproduction data to the host through the interface 38. Then, the reproduction operation is completed.

Next, an operation of the optical disk device 20 for recording user data on the optical disk 15 is explained.

Figure 13:
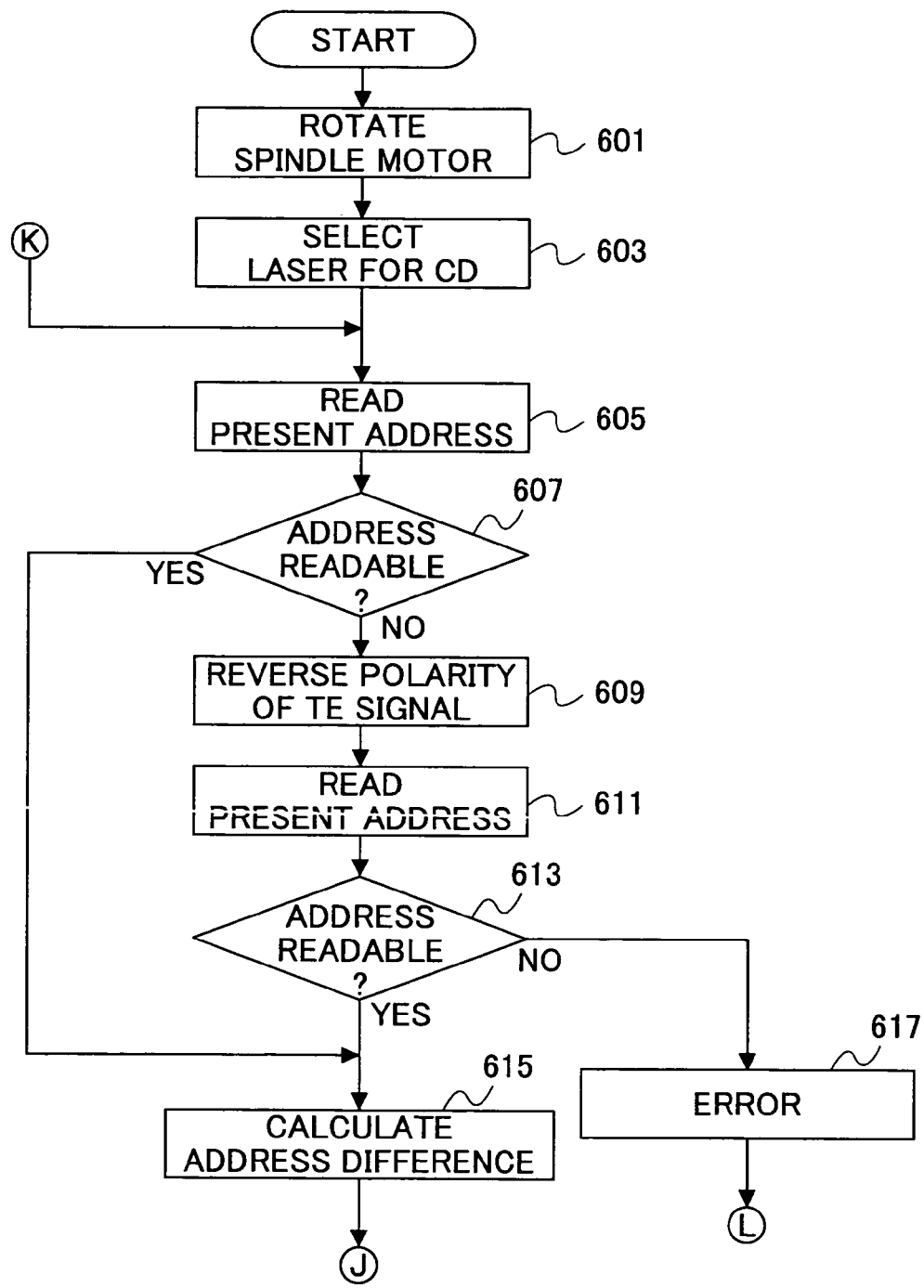
FIG. 13 is a flowchart showing an operation of recording data on the optical disk 15.

FIG. 13 is a flowchart showing an operation of recording data on the optical disk 15.

Figure 14:
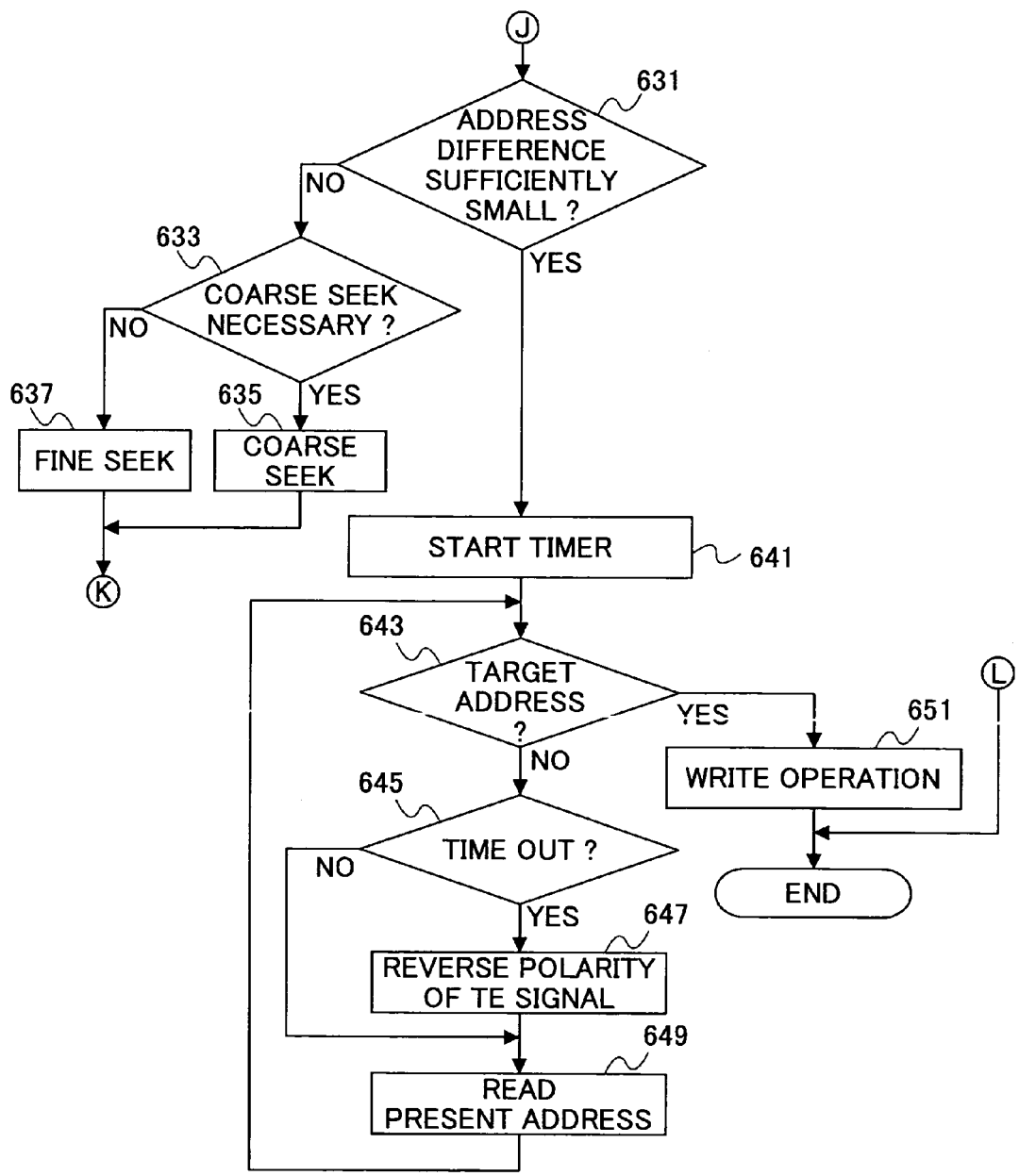
FIG. 14 is a flowchart, continuing from FIG. 13, showing the operation of recording data on the optical disk 15.

FIG. 14 is a flowchart, continuing from FIG. 13, showing the operation of recording data on the optical disk 15.

The flowcharts in FIG. 13 and FIG. 14 correspond to a series of algorithms executed by the CPU 40. When a command for requesting recording operation is received from the host, a heading address of the program corresponding to the flowcharts in FIG. 13 and FIG. 14 is set in the program counter of the CPU 40, and the computer starts the recording operation. Here, it is assumed that the switching signal Ssw and the ON-OFF signal Sonoff are initially set to zero.

As shown in FIG. 13, in step 601, a control signal is output to the driver 27 to control rotation of the spindle motor 22 based on a specified recording speed, and a message is sent to the reproduction signal processing circuit 28 indicating that a recording request is received from the host.

In addition, the buffer manager 37 is directed to store the user data received from the host to the buffer RAM 34.

When the CPU 40 receives a notification that the data stored in the buffer RAM 34 by the buffer manager 37 exceeds a preset value, the CPU 40 directs the encoder 25 to generate the write signal.

In step 603, the laser controller circuit 24 is directed to control one of the semiconductor laser 51b for CD use and the semiconductor laser 51a for DVD use according to the type of optical disk 15 to emit a laser beam at a specified recording power. Here, it is assumed that the semiconductor laser 51b for CD use is selected.

When the rotation speed of the optical disk 15 reaches a specified linear velocity, the ON-OFF signal is set to one. Due to this, it is possible perform tracking control for correcting off-track and focus control for correcting the focus offset at any time.

From the reproduction signal processing circuit 28, address information is sent to the CPU 40 at each specified time.

In step 605, an operation for acquiring the present address is performed based on the address information from the reproduction signal processing circuit 28, that is, it is attempted to read address data at the location on the optical disk 15 specified by the address information given by the reproduction signal processing circuit 28.

In step 607, it is determined whether or not the address is readable in step 605. If the address is not readable, the routine proceeds to step 609. If the address is readable, the routine proceeds to step 615.

In step 609, the polarity of the tracking error signal output to the servo controller 33 is reversed. Specifically, because the switching signal Ssw is initially set to zero, here, the switching signal Ssw is set to one so that the switch 28g selects the tracking error signal Ste2, that is, to reverse the polarity of the tracking error signal output to the servo controller 33. If the switching signal Ssw is one at present, here, the switching signal Ssw should be set to zero to reverse the polarity of the tracking error signal output to the servo controller 33.

In step 611, an operation for acquiring the present address is performed based on the address information from the reproduction signal processing circuit 28, that is, it is attempted to read address data at the location on the optical disk 15 specified by the address information given by the reproduction signal processing circuit 28.

In step 613, it is determined whether or not the address is readable in step 611. If the address is readable, the routine proceeds to step 615. If the address is not readable, the routine proceeds to step 617.

In step 615, a calculation is made to obtain a difference between the present address and the target address extracted from the command for requesting recording operation. Below, this difference is referred to as "address difference"

In step 617, after error processing, the recording operation is ended.

Subsequently, as shown in FIG. 14, in step 631, it is determined whether or not the address difference obtained in step 615 is sufficiently small, specifically, within a preset permitted range. If the address difference is within the permitted range, the routine proceeds to step 641. If the address difference is not within the permitted range, the routine proceeds to step 633.

In step 633, which is the same as step 533, referring to a threshold value as one item of the seek information stored in the flash memory 39, it is determined whether or not a coarse seek operation is necessary. If the address difference exceeds the threshold, the routine proceeds to step 635. If the address difference is below the threshold, the routine proceeds to step 637.

In step 635, the seek motor is operated to perform a coarse seek operation. Then, the routine returns to step 605 in FIG. 13.

In step 637, the tracking actuator is operated to perform a fine seek operation. Then, the routine returns to step 605 in FIG. 13.

In step 641, a timer is started. Specifically, a timer counter is set to zero to allow operation of the timer counter. Then, the timer counter starts to count by means of timer interruption.

In step 643, it is determined whether or not the present address is in agreement with the target address. If the present address is not in agreement with the target address, the routine proceeds to step 645. If the present address is in agreement with the target address, the routine proceeds to step 651.

In step 645, referring to the value of the timer counter, it is determined whether or not time-out occurs. If the time-out does not occur, the routine proceeds to step 649. If the time-out occurs, the routine proceeds to step 647.

In step 647, the polarity of the tracking error signal Ste output to the servo controller 33 is reversed. Then, the routine proceeds to step 649.

In step 649, an operation for acquiring the present address is performed based on the address information from the reproduction signal processing circuit 28, that is, it is attempted to read address data at the location on the optical disk 15 specified by the address information given by the reproduction signal processing circuit 28. Then, the routine returns to step 643.

In step 651, the encoder 25 is permitted to perform write operation. Thereby, user data is written on the optical disk 15 via the encoder 25, the laser controller circuit 24, and the optical pickup 23.

When all of the user data are written, the recording operation is completed.

As described above, according to the present embodiment, in particular, the operations of the CPU 40 and the program executed by the CPU 40, a position control device and a processing device can be provided.

Specifically, in the identification operation, as shown in FIG. 9, step 413 is performed by a trial unit, and step 415 and step 417 are performed by a control unit.

In the reproduction operation, further in the seek operation, step 505 in FIG. 11 is performed by the trial unit, and step 507 and step 509 are performed by the control unit. In the reading operation, step 549 in FIG. 12 is performed by the trial unit, and step 543 through step 547 are performed by the control unit.

In the recording operation, further in the seek operation, step 605 in FIG. 13 is performed by the trial unit, step 607 and step 609 are performed by the control unit. In the writing operation, step 649 in FIG. 12 is performed by the trial unit, step 643 through step 647 are performed by the control unit.

As will be appreciated, the present embodiment is merely for purposes of illustration, and the present invention is not limited to the present embodiment.

Hardware can be formed to include a part of elements in the above configuration for realizing the functions of the program executed by the CPU 40, or include all the elements.

In addition, in the identification operation shown in FIG. 9, step 413 corresponds to a first step of a position control method of the present invention, and step 415 and step 417 correspond to a second step of the position control method of the present invention.

In the reproduction operation, further in the seek operation, step 505 in FIG. 11 corresponds to the first step of the position control method of the present invention, step 507 and step 509 correspond to the second step of the position control method of the present invention. In the reading operation, step 549 in FIG. 12 corresponds to the first step of the position control method of the present invention, step 543 through step. 547 correspond to the second step of the position control method of the present invention.

In the recording operation, further in the seek operation, step 605 in FIG. 13 corresponds to the first step of the position control method of the present invention, step 607 and step 609 correspond to the second step of the position control method of the present invention. In the writing operation, step 649 in FIG. 14 corresponds to the first step of the position control method of the present invention, step 643 through step 647 correspond to the second step of the position control method of the present invention.

In addition, the program of the present invention stored in the flash memory 39 includes step 413 through step 417 in FIG. 9 for the identification operation.

In addition, the program of the present invention includes step 505 through step 509 in FIG. 11 for the seek operation in the reproduction operation.

In addition, the program of the present invention includes step 543 through step 549 in FIG. 12 for the reading operation in the reproduction operation.

In addition, the program of the present invention includes step 605 through step 609 in FIG. 13 for the seek operation in the recording operation.

In addition, the program of the present invention includes step 643 through step 649 in FIG. 14 for the writing operation in the recording operation.

As described above, according to the optical disk device related to the present embodiment, when the optical disk 15 is loaded, an identification operation is performed to identify the type of optical disk 15. In the identification operation, if the address data recorded on the optical disk 15 cannot be obtained, the tracking error signal output to the servo controller 33 is reversed in polarity. Due to this, even for a recording medium having low quality or a nonstandard recording medium, which are treated as invalid media and cannot be accessed by standard methods in the related art, it becomes possible to read data thereon, hence it is possible to locate the object lens to the target position; that is, it is possible to precisely and stably control the position of the object lens relative to the recording medium.

In addition, according to the present embodiment, when a command for requesting reproduction operation is received from the host, an operation for acquiring the present address is performed in order to calculate a difference between the present address and the target address (reading start address). If the address cannot be obtained, the tracking error signal output to the servo controller 33 is reversed in polarity. Due to this, even for a recording medium having low quality or a nonstandard recording medium, it is possible to perform the seek operation precisely. Further, in a reading operation, if the present address is not in agreement with the target address, the tracking error signal output to the servo controller 33 is reversed in polarity. Due to this, even for a recording medium having low quality or a nonstandard recording medium, it is possible to correctly reproduce the specified data.

Figure 15:
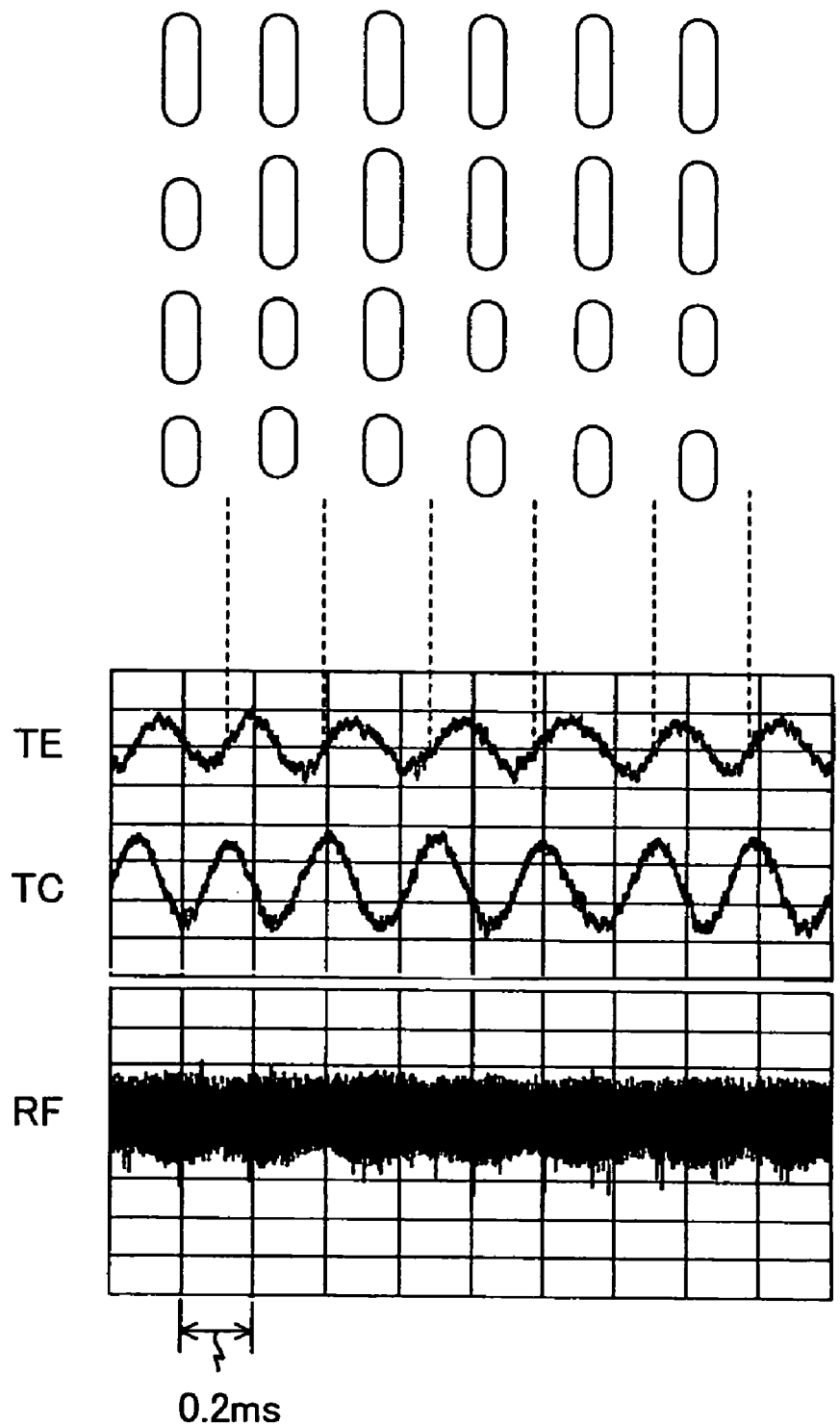
FIG. 15 shows signal waveforms for explaining abnormal tracking error signal.

FIG. 15 shows signal waveforms for explaining abnormal tracking error signal.

Figure 1:
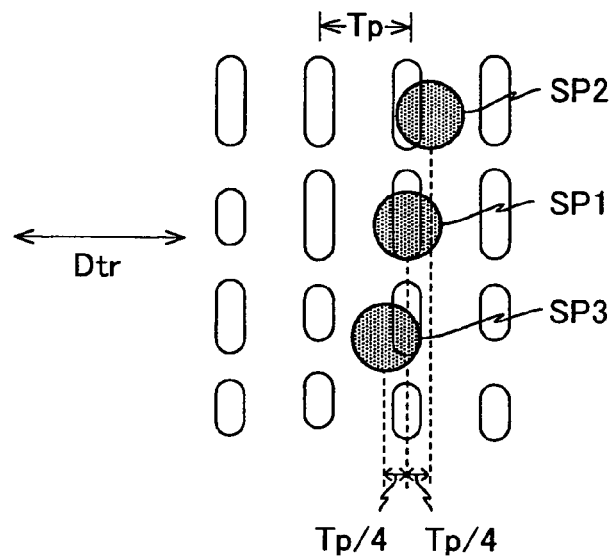
FIG. 1 is a diagram for schematically explaining a position relation of light spots in the three-spot method.
Figure 2:
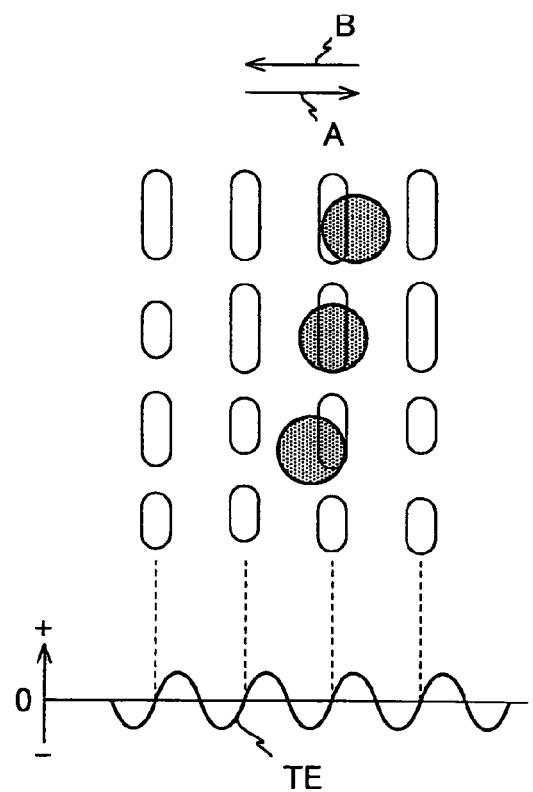
FIG. 2 is a diagram for schematically explaining an on-track determination position in the tracking error (TE) signal obtained by the three-spot method.
Figure 3:
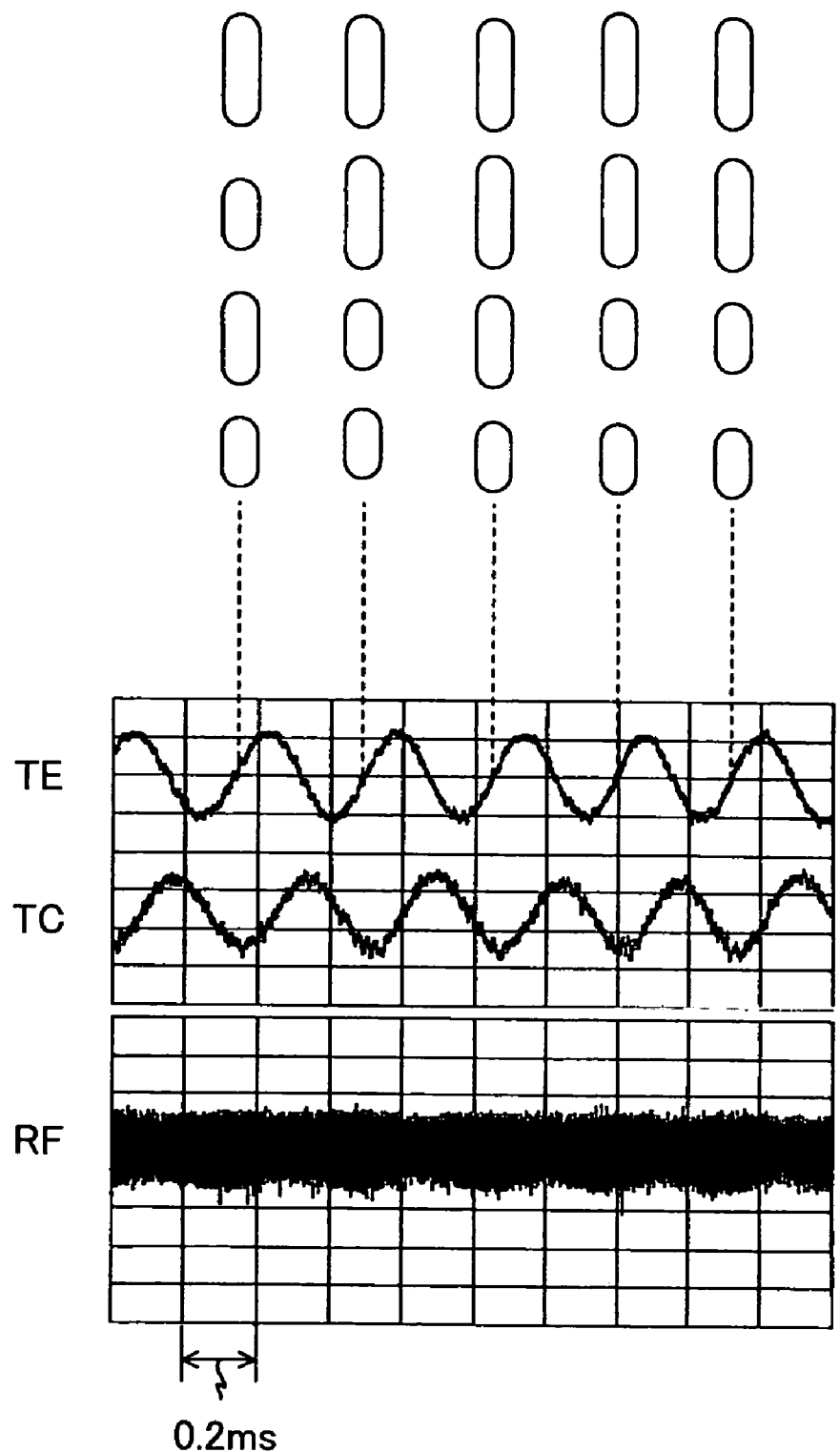
FIG. 3 shows an example of waveforms of the tracking error signal, a tracking cross (TC) signal and a RF signal observed on an oscilloscope.

When a recording medium has low quality, as shown in FIG. 15, the tracking error signal TE has an abnormal waveform, and this leads to incorrect determination of the track position. For comparison, FIG. 3 shows the normal waveform of the tracking error signal.

Figure 16:
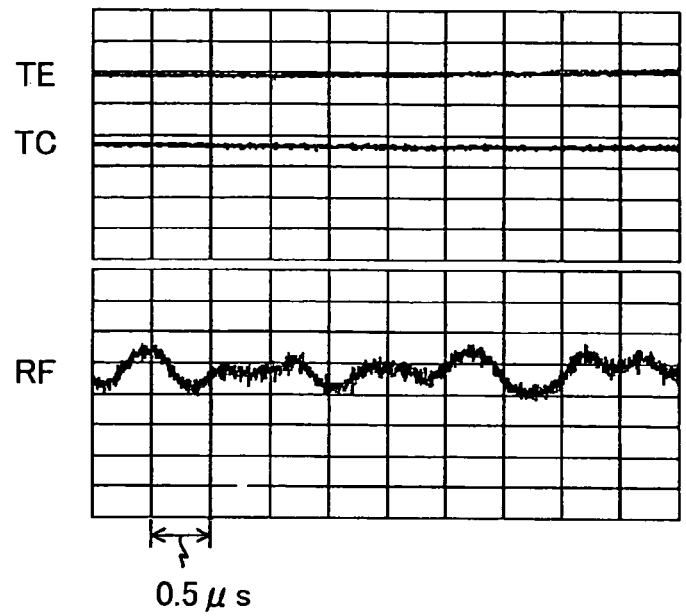
FIG. 16 shows a waveform of the RF signal obtained by tracking control based on the abnormal tracking error signal in FIG. 15.

FIG. 16 shows a waveform of the RF signal obtained by tracking control based on the abnormal tracking error signal in FIG. 15.

If the tracking error signal shown in FIG. 15 is used to perform tracking control, for example, as shown in FIG. 16, the RF signal becomes abnormal, and data on the recording medium cannot be correctly reproduced.

Figure 17:
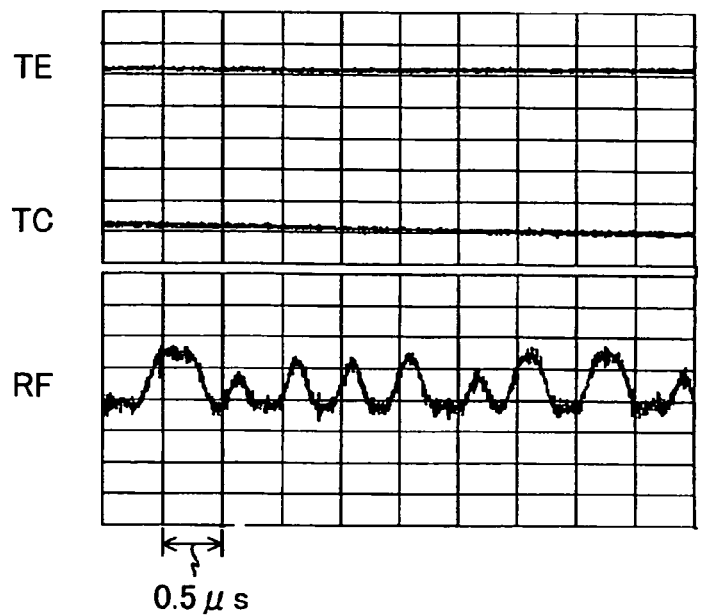
FIG. 17 shows a waveform of the RF signal obtained by tracking control based on a tracking error signal having a reversed polarity of the tracking error signal in FIG. 15.

FIG. 17 shows a waveform of the RF signal obtained by tracking control based on a tracking error signal having a reversed polarity of the tracking error signal in FIG. 15.

If the tracking error signal TE is reversed in polarity, as shown in FIG. 17, a normal RF signal can be obtained, thereby, the data on the recording medium can be correctly reproduced.

It should be noted that the scale of the vertical axis in FIG. 15 is different from those in FIG. 16 and FIG. 17.

According to the present embodiment, when a command for requesting recording operation is received from the host, an operation for acquiring the present address is performed in order to calculate a difference between the present address and the target address (writing start address). If the address cannot be obtained, the tracking error signal output to the servo controller 33 is reversed in polarity. Due to this, even for a recording medium having low quality or a nonstandard recording medium, it is possible to perform the seek operation precisely. Further, in a writing operation, if the present address is not in agreement with the target address, the tracking error signal output to the servo controller 33 is reversed in polarity. Due to this, even for a recording medium having low quality or a nonstandard recording medium, it is possible to correctly record data to a specified region.

In the above, it is described that if the address recorded on the optical disk 15 cannot be obtained, the tracking error signal output to the servo controller 33 is reversed in polarity. But the present invention is not limited to this. For example, the tracking servo information may be switched.

Figure 18:
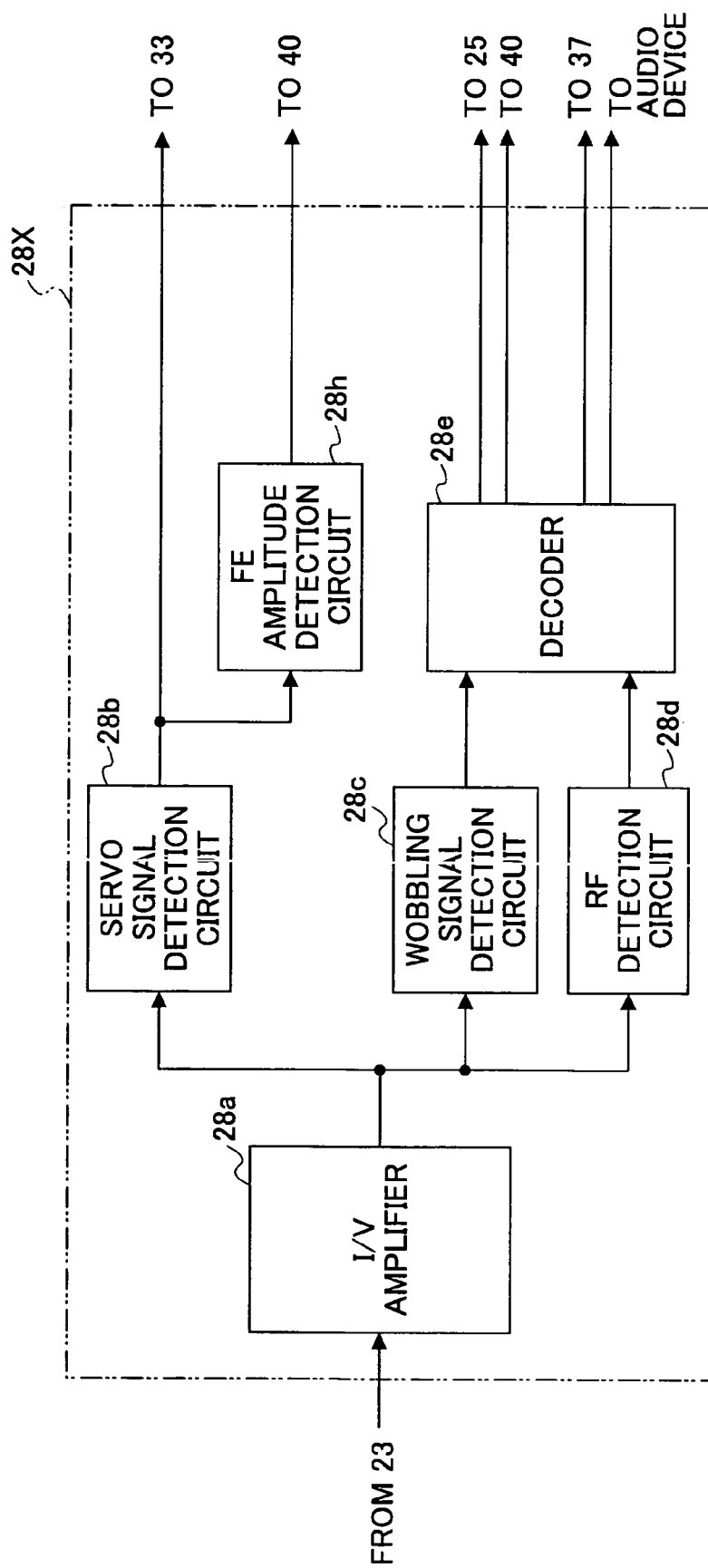
FIG. 18 is a block diagram showing a configuration of a reproduction signal processing circuit 28X as a modification of the present embodiment.

FIG. 18 is a block diagram showing a configuration of a reproduction signal processing circuit 28X as a modification to the present embodiment.

As shown in FIG. 18, a reproduction signal processing circuit 28X is used instead of the reproduction signal processing circuit 28 in the optical disk device 20. That is, the tracking error signal (same as the tracking error signal Ste1) detected by the servo signal detection circuit 28b is directly output to the servo controller 33. Therefore, the signal polarity reversal circuit 28f, the switch 28g, and the switching signal Ssw are not needed.

Figure 19A:
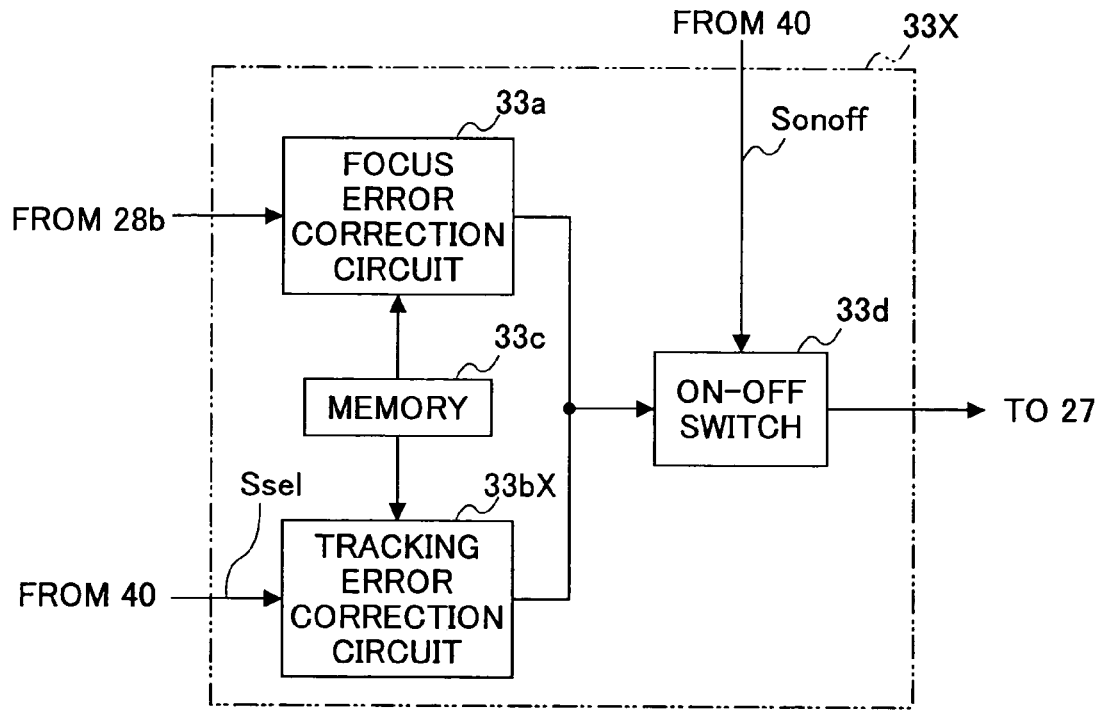
FIG. 19A is a block diagram showing a configuration of a servo controller 33X in the reproduction signal processing circuit 28X.

FIG. 19A is a block diagram showing a configuration of a servo controller 33X in the reproduction signal processing circuit 28X.

As shown in FIG. 19A, a servo controller 33X may be used instead of the servo controller 33 on the optical disk device 20. Further, for example, two sets of tracking servo information (the first tracking servo information, the second tracking servo information) may be stored in the memory 33c, and the two sets of tracking servo information can be switched with each other.

Figure 19B:
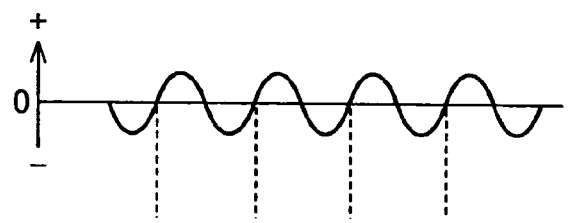
FIGS. 19B and 19C are signal waveforms for explaining determination of the on-track determination position by using the tracking error signal in the tracking error correction circuit 33bX in FIG. 19A.
Figure 19C:
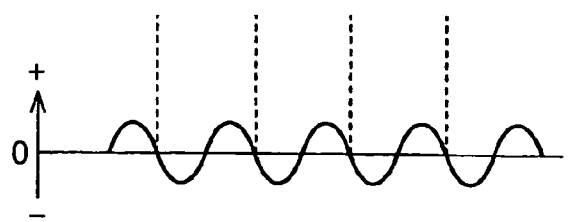

FIGS. 19B and 19C are signal waveforms for explaining determination of the on-track determination position by using the tracking error signal in the tracking error correction circuit in FIG. 19A.

When the first tracking servo information is selected, as shown in FIG. 19B, the same as the previously described tracking servo information, when the object lens is moved in the +Z direction, that is, the rotational axis direction of the optical disk 15, the level of the tracking error signal increases gradually; when the level of the tracking error signal becomes zero (that is, at the zero-crossing point), it can be determined that the on-track condition occurs. When the object lens is moved in the −Z direction, the level of the tracking error signal decreases gradually; when the level of the tracking error signal TE becomes zero (that is, at the zero-crossing point), it can be determined that the on-track condition occurs.

When the second tracking servo information is selected, as shown in FIG. 19C, the same as the previously described tracking servo information, when the object lens is moved in the +Z direction, the level of the tracking error signal decreases gradually; when the level of the tracking error signal becomes zero (that is, at the zero-crossing point), it can be determined that the on-track condition occurs. When the object lens is moved in the −Z direction, the level of the tracking error signal increases gradually; when the level of the tracking error signal TE becomes zero (that is, at the zero-crossing point), it can be determined that the on-track condition occurs.

That is, the on-track determination position determined based on the first tracking servo information and that based on the second tracking servo information differs by half of a wavelength. Of course, the difference between two on-track determination positions is not limited to half of a wavelength, for example, in response to the characteristics of the obtained tracking error signal, the difference between two on-track determination positions can be modified.

In addition, the servo controller 33X selects one of the first tracking servo information and the second tracking servo information according to a selection signal Ssel from the CPU 40. For example, when the selection signal Ssel is one, the servo controller 33X selects the second tracking servo information, and when the selection signal Ssel is zero, the servo controller 33X selects the first tracking servo information.

Therefore, in the identification operation, instead of the processing in step 417 in FIG. 9, the selection signal Ssel is set to one so that the servo controller 33X selects the second tracking servo information.

In the reproduction operation, instead of the processing in step 509 in FIG. 11 and step 547 in FIG. 12, if the present value of the selection signal Ssel is zero, the selection signal Ssel is changed to one, if the present value of the selection signal Ssel is one, the selection signal Ssel is changed to zero.

In the recording operation, instead of the processing in step 609 in FIG. 13 and step 645 in FIG. 14, if the present value of the selection signal Ssel is zero, the selection signal Ssel is changed to one, if the present value of the selection signal Ssel is one, the selection signal Ssel is changed to zero.

In this way, the same effect as that described previously can be obtained.

In the above, it is described that in the identification operation, if the address data recorded on the optical disk 15 cannot be obtained, the tracking error signal output to the servo controller 33 is reversed in polarity, but the present invention is not limited to this. For example, the optical disk device 20 may be set that the tracking error signal output to the servo controller 33 is reversed in polarity when disk information recorded on the optical disk 15 cannot be obtained. That is, it is sufficient if the quality of the optical disk can be estimated. In addition, in the identification operation, the results of the estimation of the disk quality may be stored in the flash memory 39 in correspondence with the disk information. Due to this, during the recording operation and the reproduction production, the tracking error signal may be corrected according to the quality of the optical disk.

In the above, it is described that in the servo controller 33 the ON-OFF switch is arranged on the output side of the correction circuits, but the present invention is not limited to this, as the ON-OFF switch may also be arranged on the input side of the correction circuits.

In the above, it is described that in the servo controller 33 there is only one ON-OFF switch, but the present invention is not limited to this. For example, an ON-OFF switch used for the focus error correction circuit 33a and an ON-OFF switch used for the tracking error correction circuit 33b may be provided separately. In this case, the ON-OFF switch and the correction circuit may be made integrally. Further, the ON-OFF switch may be provided in the reproduction signal processing circuit 28, but not the servo controller 33. In this case, this ON-OFF switch controls the ON/OFF state of the signal output from the reproduction signal processing circuit 28 to the servo controller 33.

In the above, it is described that for a DVD, the differential push-pull (DPP) method is used to detect the tracking error signal, and for a CD, the three-spot method is used to detect the tracking error signal, but the present invention is not limited to this. Any method can be used as long as the method of position control can be switched depending on whether or not the predetermined information stored on the optical disk can be obtained when controlling the position of the object lens.

In the above, it is described that the optical disk device 20 supports both DVD and CD, but the present invention is not limited to this. The optical disk device 20 may support only DVD or CD, or the optical disk device 20 may include three or more lasers to emit laser beams of three or more different wavelengths. In this case, for example, a semiconductor laser emitting a laser beam having a wavelength of 405 nm may be installed.

Further, as described above, the present invention is applicable to both optical disks having guide grooves and optical disks without a guide groove. For this purpose, the optical disk device should support the optical disks in use.

Generally, recordable optical disks having guide grooves are classified into groups according to the recording methods. Optical disks of group 1 record data in the guide grooves. For example, optical disks of group 1 include CD-R, CD-RW, DVD+R, DVD+RW, DVD-R, DVD-RW, and so on. Optical disks of group 2 record data in the space between the guide grooves, that is, in the lands. For example, optical disks of group 2 include MO (Magneto Optical disk), and so on. Optical disks of group 3 record data in both the guide grooves and in the lands. Optical disks of group 3 include DVD-RAM, and so on.

For example, when reproducing data on an optical disk of group 1, according to the present invention, first an attempt is made to acquire predetermined address information using the tracking error signal having a polarity related to guide grooves, and if the address information cannot be obtained, the tracking error signal is reversed in polarity to acquire the predetermined address information or information of the guide grooves.

When reproducing data on an optical disk of group 2, according to the present invention, first an attempt is made to acquire predetermined address information using the tracking error signal having a polarity related to lands, and if the address information cannot be obtained, the tracking error signal is reversed in polarity to acquire the predetermined address information or information of the lands.

When reproducing data on an optical disk of group 3, according to the present invention, first the polarity of the tracking error signal is set depending on where is the target place to obtain the address data, that is in grooves or in lands, and using the tracking error signal having this polarity, an attempt is made to acquire predetermined address information, and if the address information cannot be obtained, the tracking error signal is reversed in polarity to acquire the predetermined address information.

In the above, it is described that the semiconductor laser 51a, the semiconductor laser 51b, and the light reception unit 59 are made into one piece, but the present invention is not limited to this. The light reception unit 59 may be arranged separately. Further, the semiconductor laser 51a, the semiconductor laser 51b may also be arranged separately.

In the above, it is described that holograms are used to branch the returning light beam into the direction toward the reception plane of the light reception unit 59, but the present invention is not limited to this. For example, beam splitters may also be used for this purpose.

In the above, it is described that both the returning 650 nm light beam and the returning 780 nm light beam are received by the light reception unit 59, but the present invention is not limited to this. For example, a light reception unit for detecting the returning 650 nm light beam, and a light reception unit for detecting the returning 780 nm light beam may be separate.

Further, in the above description, it is described that the position control program is stored in the flash memory 39, but the position control program may also be stored in other storage media, for example, CD-ROM, CD-R, CD-RW, DVD-ROM, DVD-RAM, DVD+R, DVD+RW, DVD-R, DVD-RW, MO (Magneto Optical disk), magnetic disks, memory sticks, or memory cards. In this case, drives of these storage media should be installed, too, and the position control program may be loaded to the flash memory 39 from these storage media via the drives. Alternatively, the position control program may be loaded to the flash memory 39 via a network.

In the above, the optical disk device 20 capable of recording and reproduction is used for illustration, but the present invention is not limited to this. The present invention is applicable to an optical disk device capable of at least reproduction among recording, reproduction and deletion. Further, the optical disk device may be installed inside a computer, or may be used as an external device. Furthermore, to build the optical disk device in a computer, the computer need not be a desktop type, it may alternatively be a note type.

In the above, it is described that the interface is in compliance with the ATAPI (AT Attachment Packet Interface) standards, but the present invention is not limited to this. For example, the interface may be in compliance with any other standards, such as, ATI (AT Attachment), SCSI (Small Computer System Interface), USB(Universal Serial Bus) 1.0, USB 2.0, IEEE1394, IEEE802.3, serial ATA, or serial ATAPI.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, as described above, according to the position control method and the position control device of the present invention, it is possible to precisely and stably control the position of the object lens relative to the recording medium.

According to the position control program and the storage medium of the present invention, the computer executes the program and controls the optical disk device, and thereby precisely and stably controls the position of the object lens relative to the recording medium.

According to the optical disk device of the present invention, it is possible to precisely and stably access the recording medium.

This patent application is based on Japanese Priority Patent Application No. 2003-046752 filed on Feb. 25, 2003 and Japanese Priority Patent Application No. 2003-090468 filed on Mar. 28, 2003, and the entire contents of which are hereby incorporated by reference.

What is claimed is:

1. A position control method for controlling a position of an object lens in a direction perpendicular to a tangential direction of a spiral track or of concentric tracks formed on a recording surface of a recording medium without a guide groove, said position control method comprising:
   a first step of trying to read a predetermined data recorded on the recording medium;
   a second step of determining whether or not the predetermined data is readable; and
   a third step of, according to whether or not the predetermined data is readable, switching a criterion for controlling the position of the object lens based on a tracking error signal,
   wherein the first step is performed when determining a type of the recording medium,
   wherein the predetermined data includes an address data,
   wherein:
      a first light source is used when the recording medium is determined to be of a first type, and
      a second light source is used when the recording medium is determined to be of a second type,
   wherein the third step comprises a step of, if the predetermined data is not readable, switching to a criterion that includes shifting an on-track determination position in the tracking error signal by a predetermined amount and controlling the position of the object lens with the tracking error signal, said on-track determination position of the tracking error signal being a position at which it is determined that on-track occurs, and
   wherein the predetermined amount equals half of a wavelength of a waveform of the tracking error signal.

2. The position control method as claimed in claim 1, wherein: the first step is performed during a seek operation of the object lens.

3. The position control method as claimed in claim 1, wherein: the first step is performed when reproducing a data recorded on the recording medium.

4. A position control method for controlling a position of an object lens in a direction perpendicular to a tangential direction of a spiral track or of concentric tracks formed on a recording surface of a recording medium having a plurality of guide grooves, said position control method comprising:
   a first step of trying to read a predetermined data recorded in the guide grooves or in a region between two of the guide grooves on the recording medium following a criterion for controlling the object lens based on a tracking error signal with respect to the guide grooves or a tracking error signal with respect to the region between two of the guide grooves;
   a second step of determining whether or not the predetermined data is readable; and
   a third step of, according to whether or not the predetermined data is readable, switching the criterion and trying again to read the predetermined data recorded in the guide grooves or in the region between two of the guide grooves,
   wherein the predetermined data includes an address data,
   wherein the first step is performed when determining a type of the recording medium,
   wherein:
      a first light source is used when the recording medium is determined to be of a first type, and
      a second light source is used when the recording medium is determined to be of a second type,
   wherein the third step comprises a step of, if the predetermined data is not readable, switching to a criterion that includes shifting an on-track determination position in the tracking error signal by a predetermined amount and controlling the position of the object lens with the tracking error signal, said on-track determination position of the tracking error signal being a position at which it is determined that on-track occurs, and
   wherein the predetermined amount equals half of a wavelength of a waveform of the tracking error signal.

5. The position control method as claimed in claim 4, wherein: the first step is performed during a seek operation of the object lens.

6. The position control method as claimed in claim 4, wherein: the first step is performed when reproducing a data recorded on the recording medium.

7. A position control device for controlling a position of an object lens in a direction perpendicular to a tangential direction of a spiral track or of concentric tracks formed on a recording surface of a recording medium without a guide groove, said position control device comprising:
  a trial unit configured to try to read a predetermined data recorded on the recording medium, wherein trying to read a predetermined data is performed when determining a type of the recording medium; and
  a control unit configured to determine whether or not the predetermined data is readable, and according to whether or not the predetermined data is readable, to switch a criterion for controlling the position of the object lens based on a tracking error signal for control of the position of the object lens,
  wherein the predetermined data includes an address data, wherein:
    a first light source is used when the recording medium is determined to be of a first type, and
    a second light source is used when the recording medium is determined to be of a second type,
  wherein if the predetermined data is not readable, the control unit switches to a criterion that includes shifting an on-track determination position in the tracking error signal by a predetermined amount and controlling the position of the object lens with the tracking error signal, said on-track determination position of the tracking error signal being a position at which it is determined that on-track occurs, and
  wherein the predetermined amount equals half of a wavelength of a waveform of the tracking error signal.

8. A position control device for controlling a position of an object lens in a direction perpendicular to a tangential direction of a spiral track or of concentric tracks formed on a recording surface of a recording medium having a plurality of guide grooves, said position control device comprising:
  a trial unit configured to try to read a predetermined data recorded in the guide grooves or in a region between two of the guide grooves on the recording medium following a criterion for controlling the object lens based on a tracking error signal with respect to the guide grooves or the region between two of the guide grooves, wherein trying to read a predetermined data is performed when determining a type of the recording medium; and
  a control unit configured to determine whether or not the predetermined data is readable, and according to whether or not the predetermined data is readable, to change the criterion and to try again to read the predetermined data recorded in the guide grooves or in a region between two of the guide grooves,
  wherein the predetermined data includes an address data, wherein:
    a first light source is used when the recording medium is determined to be of a first type, and
    a second light source is used when the recording medium is determined to be of a second type,
  wherein if the predetermined data is not readable, the control unit switches to a criterion that includes shifting an on-track determination position in the tracking error signal by a predetermined amount and controlling the position of the object lens with the tracking error signal, said on-track determination position of the tracking error signal being a position at which it is determined that on-track occurs, and
  wherein the predetermined amount equals half of a wavelength of a waveform of the tracking error signal.

9. The position control method as claimed in claim 1, wherein, if it is determined that the recording medium is a DVD, the tracking error signal is detected using a differential push-pull method.

10. The position control method as claimed in claim 1, wherein the tracking error control signal is based on a vertical distance of the object lens from the recording medium.

* * * * *